US012748757B2

(12) United States Patent
Nitisastro et al.

(10) Patent No.: US 12,748,757 B2
(45) Date of Patent: Sep. 29, 2026

(54) RUNTIME PRUNING FOR TOP K QUERIES

(71) Applicant: Snowflake Inc., Bozeman, MT (US)

(72) Inventors: Jonathan Christian Nitisastro, San Mateo, CA (US); Zhaohui Zhang, Redwood City, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/830,346

(22) Filed: Sep. 10, 2024

(65) Prior Publication Data

US 2026/0072915 A1 Mar. 12, 2026

(51) Int. Cl.
*G06F 16/2453* (2019.01)

(52) U.S. Cl.
CPC .............................. *G06F 16/24549* (2019.01)

(58) Field of Classification Search
CPC ................................................ G06F 16/24549
See application file for complete search history.

(56) References Cited

U.S. PATENT DOCUMENTS

| | | | |
|---|---|---|---|
| 4,956,774 | A | 9/1990 | Shibamiya et al. |
| 6,154,572 | A | 11/2000 | Chaddha |
| 6,374,232 | B1 | 4/2002 | Dageville et al. |
| 6,571,233 | B2 | 5/2003 | Beavin et al. |
| 6,957,225 | B1 | 10/2005 | Zait et al. |
| 7,171,427 | B2 | 1/2007 | Witkowski et al. |
| 7,454,418 | B1 | 11/2008 | Wang et al. |
| 7,493,337 | B2 | 2/2009 | Chaudhuri et al. |
| 7,814,104 | B2 | 10/2010 | Raghavan et al. |
| 7,962,521 | B2 | 6/2011 | Brown et al. |
| 7,970,756 | B2 | 6/2011 | Beavin et al. |
| 8,209,178 | B1 | 6/2012 | Talbot et al. |
| 8,458,156 | B1 | 6/2013 | Sharifi et al. |
| 8,666,976 | B2 | 3/2014 | Merz |

(Continued)

FOREIGN PATENT DOCUMENTS

| | | |
|---|---|---|
| CN | 113051351 | 6/2021 |
| DE | 202020005734 | 4/2022 |

(Continued)

OTHER PUBLICATIONS

US 11,397,751 B2, 07/2022, Chu et al. (withdrawn)

(Continued)

*Primary Examiner* — Marc S Somers
(74) *Attorney, Agent, or Firm* — Schwegman Lundberg & Woessner, P.A.

(57) ABSTRACT

A top K query directed at a table is received. Run-time pruning is performed during execution of the top K query on the table. The run-time pruning comprises determining, by a top K node, a current boundary based on a set of values identified by a table scan node in scanning the table and applying, by the table scan node, the current boundary to prune data during the scanning of the table. The applying of the current boundary comprises reducing scanning ranges of the table scan node based on the top K column being a key column of the table and filtering values scanned by the table scan node based on the top K column being a non-key column of the table. The result set is returned responsive to the top K query based on the run-time pruning performed during execution of the top K query on the table.

30 Claims, 9 Drawing Sheets

(56) References Cited

U.S. PATENT DOCUMENTS 8,825,678 B2 9/2014 Potapov et al.
8,887,286 B2 11/2014 Dupont et al.
9,223,850 B2 12/2015 Chen
9,298,726 B1 3/2016 Mondal et al.
9,471,711 B2 10/2016 Abadi et al.
9,507,825 B2 11/2016 Baer et al.
9,514,187 B2 12/2016 Ziauddin
9,569,490 B1* 2/2017 Kalarikal Janardhana .................. G06F 16/248
9,684,671 B1 6/2017 Dorin et al.
10,025,823 B2 7/2018 Das et al.
10,311,062 B2 6/2019 McPherson et al.
10,353,867 B1 7/2019 Wong et al.
10,388,272 B1 8/2019 Thomson et al.
10,528,599 B1 1/2020 Pandis et al.
10,573,312 B1 2/2020 Thomson et al.
10,628,418 B2 4/2020 Weyerhaeuser et al.
10,635,671 B2 4/2020 Sheng et al.
10,649,991 B2 5/2020 Finlay et al.
10,685,052 B2 6/2020 Winther
10,705,809 B2 7/2020 Makkar
10,713,243 B2 7/2020 Mathur
10,769,150 B1 9/2020 Cruanes et al.
10,812,495 B2 10/2020 Traore et al.
10,838,963 B2 11/2020 Brodt et al.
10,860,832 B2 12/2020 Wang
10,901,948 B2 1/2021 Ackerman et al.
10,942,925 B1 3/2021 Cruanes et al.
10,997,179 B1 5/2021 Cruanes et al.
11,016,975 B1 5/2021 Cruanes et al.
11,037,258 B2 6/2021 Brenner et al.
11,042,650 B2 6/2021 Fu et al.
11,074,261 B1 7/2021 Pandis et al.
11,086,875 B2 8/2021 Cruanes et al.
11,113,286 B2 9/2021 Cruanes et al.
11,163,745 B2 11/2021 Coleman et al.
11,176,133 B2 11/2021 Horn et al.
11,194,793 B1 12/2021 Srivastava et al.
11,308,089 B2 4/2022 Cruanes et al.
11,308,090 B2 4/2022 Allahverdiyev et al.
11,321,325 B2 5/2022 Cruanes et al.
11,372,860 B2 6/2022 Heimel et al.
11,880,369 B1* 1/2024 Heimel ............. G06F 16/24578
11,995,080 B1* 5/2024 Tsirogiannis ..... G06F 16/24549
2004/0243816 A1 12/2004 Hacigumus et al.
2005/0120004 A1 6/2005 Stata et al.
2005/0198076 A1 9/2005 Stata et al.
2006/0020579 A1 1/2006 Freedman et al.
2007/0250476 A1 10/2007 Krasnik
2008/0294696 A1 11/2008 Frandzel
2009/0070303 A1 3/2009 Beavin et al.
2009/0100055 A1 4/2009 Wang
2010/0125594 A1 5/2010 Li et al.
2010/0281017 A1 11/2010 Hu et al.
2010/0318519 A1 12/2010 Hadjieleftheriou et al.
2011/0213775 A1 9/2011 Franke et al.
2012/0109888 A1 5/2012 Zhang et al.
2012/0271838 A1* 10/2012 Whang ..................... G06F 7/22 707/E17.104
2013/0166553 A1 6/2013 Yoon et al.
2013/0166557 A1 6/2013 Fricke et al.
2013/0346720 A1 12/2013 Colgrove et al.
2014/0095502 A1 4/2014 Ziauddin et al.
2014/0114942 A1 4/2014 Belakovskiy et al.
2014/0154352 A1 6/2014 Altonen et al.
2014/0201126 A1 7/2014 Zadeh et al.
2014/0223565 A1 8/2014 Cohen
2014/0365424 A1 12/2014 Herbst et al.
2015/0134670 A1 5/2015 Liu et al.
2015/0242506 A1 8/2015 Dickie et al.
2015/0254338 A1 9/2015 Cheluvaraja et al.
2015/0269934 A1 9/2015 Biadsy et al.
2015/0286681 A1 10/2015 Baer et al.
2015/0286682 A1 10/2015 Ziauddin
2016/0026667 A1 1/2016 Mukherjee et al.
2016/0162364 A1 6/2016 Mutha et al.
2016/0188623 A1 6/2016 Finlay et al.
2016/0196306 A1 7/2016 Beavin et al.
2016/0292201 A1 10/2016 Asaad et al.
2016/0350347 A1 12/2016 Das et al.
2016/0350375 A1 12/2016 Das et al.
2016/0350392 A1 12/2016 Rice et al.
2017/0031975 A1 2/2017 Mishra et al.
2017/0031976 A1 2/2017 Chavan et al.
2017/0060944 A1 3/2017 Khayyat et al.
2017/0109295 A1 4/2017 Lasperas et al.
2017/0116136 A1 4/2017 Macnicol et al.
2017/0116271 A1 4/2017 Ziauddin et al.
2017/0139989 A1 5/2017 Weyerhaeuser et al.
2017/0220652 A1 8/2017 Kazi et al.
2017/0300862 A1 10/2017 Bhadouria et al.
2018/0052904 A1 2/2018 Fusco et al.
2018/0068008 A1 3/2018 Cruanes et al.
2018/0101540 A1 4/2018 Stoop et al.
2018/0113889 A1 4/2018 Brodt
2018/0275982 A1 9/2018 Hunt et al.
2018/0285418 A1 10/2018 Petropoulos et al.
2018/0307857 A1 10/2018 Beecham et al.
2018/0336263 A1 11/2018 Bensberg et al.
2018/0357262 A1 12/2018 He et al.
2019/0087457 A1* 3/2019 Bellamkonda .... G06F 16/24553
2019/0102441 A1 4/2019 Malak et al.
2019/0130250 A1 5/2019 Park et al.
2019/0205376 A1 7/2019 Merhav et al.
2019/0220464 A1 7/2019 Butani
2019/0294615 A1 9/2019 Plattner et al.
2019/0303270 A1 10/2019 Hoermann
2019/0332722 A1 10/2019 Ogren et al.
2019/0370241 A1 12/2019 Miraldo et al.
2020/0026788 A1 1/2020 Bellamkonda et al.
2020/0117546 A1 4/2020 Wong et al.
2020/0125674 A1 4/2020 Arunski et al.
2020/0175961 A1 6/2020 Thomson et al.
2020/0184278 A1 6/2020 Zadeh et al.
2020/0285761 A1 9/2020 Buck et al.
2020/0373946 A1 11/2020 Lee et al.
2021/0073219 A1 3/2021 Barbas et al.
2021/0200772 A1 7/2021 Cruanes et al.
2021/0216555 A1 7/2021 Cruanes et al.
2021/0271644 A1 9/2021 Chinthekindi et al.
2021/0319025 A1 10/2021 Cruanes et al.
2021/0357411 A1 11/2021 Cruanes et al.
2021/0365461 A1 11/2021 Allahverdiyev et al.
2021/0397619 A1 12/2021 Heimel et al.
2022/0012246 A1 1/2022 Oukid et al.
2022/0012247 A1 1/2022 Oukid et al.
2022/0207041 A1 6/2022 Allahverdiyev et al.
2022/0215026 A1 7/2022 Su et al.
2022/0215027 A1 7/2022 Cruanes et al.
2022/0277013 A1 9/2022 Cruanes et al.
2022/0284025 A1 9/2022 Adams et al.
2022/0292098 A1 9/2022 Heimel et al.
2022/0309063 A1 9/2022 Du et al.
2023/0034257 A1 2/2023 Bei et al.
2023/0064151 A1* 3/2023 Allahverdiyev .... G06F 16/2272
2023/0229676 A1* 7/2023 Fang ..................... G06F 16/285 707/739
2024/0168953 A1 5/2024 Heimel et al.

FOREIGN PATENT DOCUMENTS

EP 2434417 3/2012
WO 2021133433 7/2021
WO 2022016170 1/2022

OTHER PUBLICATIONS

Wikipedia, SQL Syntax, https://en.wikipedia.org/w/index.php?title=SQL_syntax&oldid=1215851478, Mar. 27, 2024, 12 pp. (Year: 2024).*

"International Application Serial No. PCT US2020 044199, International Search Report mailed Aug. 26, 2020", 2 pgs.

(56) References Cited

OTHER PUBLICATIONS

"International Application Serial No. PCT US2020 044199, Written Opinion mailed Aug. 26, 2020", 6 pgs.
"European Application Serial No. 20216097.4, Extended European Search Report mailed May 20, 2021", 7 pgs.
"International Application Serial No. PCT US2021 070808, International Search Report mailed Jul. 26, 2021", 2 pgs.
"International Application Serial No. PCT US2021 070808, Written Opinion mailed Jul. 26, 2021", 3 pgs.
"Indian Application Serial No. 202044053756, First Examination Report mailed Dec. 21, 2021", with English translation, 6 pages.
"European Application Serial No. 20216097.4, Response filed Dec. 22, 2021 to Extended European Search Report mailed May 20, 2021", 32 pgs.
"Indian Application Serial No. 202044053756, Response filed Jun. 21, 2022 to First Examination Report mailed Dec. 21, 2021", with English translation, 31 pages.
"International Application Serial No. PCT US2020 044199, International Preliminary Report on Patentability mailed Jul. 7, 2022", 8 pgs.
"U.S. Appl. No. 17/804,630, Non Final Office Action mailed Jul. 14, 2022", 14 pgs.
"Korean Application Serial No. 10-2021-7031021, Notice of Preliminary Rejection mailed Jul. 20, 2022", with English translation, 13 pages.
"U.S. Appl. No. 17/657,019, Response filed Aug. 17, 2022 to Non Final Office Action mailed May 24, 2022", 11 pgs.
"U.S. Appl. No. 17/804,630, Response filed Sep. 29, 2022 to Non Final Office Action mailed Jul. 14, 2022", 10 pgs.
"U.S. Appl. No. 18/057,563, Non Final Office Action mailed Jul. 10, 2023", 20 pgs.
"U.S. Appl. No. 18/057,563, Response filed Oct. 10, 2023 to Non Final Office Action mailed Jul. 10, 2023", 13 pgs.
"U.S. Appl. No. 18/057,563, Notice of Allowance mailed Nov. 15, 2023", 8 pgs.
"U.S. Appl. No. 18/534,382, Non Final Office Action mailed Jun. 4, 2025", 43 pgs.
"U.S. Appl. No. 18/534,382, Response filed Sep. 3, 2025 to Non Final Office Action mailed Jun. 4, 2025", 16 pgs.
"U.S. Appl. No. 18/534,382, Final Office Action mailed Sep. 15, 2025", 43 pgs.
Han, "Efficient top-k dominating computation on massive data", IEEE Transactions on Knowledge and Data Engineering 29.6, Jun. 2017, 13 pages.
Pang, Hweehwa, "Efficient processing of exact top-k queries over disk-resident sorted lists", The VLDB Journal 19, Dec. 2009, 20 pages.
"U.S. Appl. No. 16/727,315, Non Final Office Action mailed Mar. 2, 2020", 12 pgs.
"U.S. Appl. No. 16/727,315, Response Filed May 27, 2020 to Non Final Office Action mailed Mar. 2, 2020", 14 pgs.
"U.S. Appl. No. 16/727,315, Examiner Interview Summary mailed Jun. 2, 2020", 3 pgs.
"U.S. Appl. No. 16/727,315, Notice of Allowance mailed Jun. 8, 2020", 9 pgs.
"U.S. Appl. No. 16/932,462, Non Final Office Action mailed Aug. 21, 2020", 11 pgs.
"U.S. Appl. No. 16/932,462, Response filed Nov. 23, 2020 to Non Final Office Action mailed Aug. 21, 2020", 12 pgs.
"U.S. Appl. No. 16/932,462, Examiner Interview Summary mailed Nov. 25, 2020", 3 pgs.
"U.S. Appl. No. 16/932,462, Notice of Allowance mailed Dec. 15, 2020", 9 pgs.
"U.S. Appl. No. 17/086,239, Non Final Office Action mailed Dec. 17, 2020", 15 pgs.
"U.S. Appl. No. 17/086,228, Non Final Office Action mailed Dec. 28, 2020", 12 pgs.
"U.S. Appl. No. 17/086,228, Response filed Jan. 4, 2021 to Non Final Office Action mailed Dec. 28, 2020", 8 pgs.
"U.S. Appl. No. 17/086,228, Notice of Allowance mailed Jan. 22, 2021", 7 pgs.
"U.S. Appl. No. 17/086,239, Response filed Mar. 17, 2021 to Non Final Office Action mailed Dec. 17, 2020", 12 pgs.
"U.S. Appl. No. 17/161,115, Non Final Office Action mailed Mar. 23, 2021", 19 pgs.
"U.S. Appl. No. 17/086,239, Notice of Allowance mailed Apr. 9, 2021", 15 pgs.
"U.S. Appl. No. 17/161,115, Response filed Apr. 15, 2021 to Non Final Office Action mailed Mar. 23, 2021", 12 pgs.
"U.S. Appl. No. 17/161,115, Final Office Action mailed Apr. 28, 2021", 17 pgs.
"U.S. Appl. No. 17/161,115, Response filed Apr. 30, 2021 to Final Office Action mailed Apr. 28, 2021", 8 pgs.
"U.S. Appl. No. 17/161,115, Notice of Allowance mailed May 12, 2021", 8 pgs.
"U.S. Appl. No. 17/218,962, Non Final Office Action mailed Jun. 4, 2021", 21 pgs.
"U.S. Appl. No. 17/218,962, Response filed Jun. 10, 2021 to Non Final Office Action mailed Jun. 4, 2021", 9 pgs.
"U.S. Appl. No. 17/161, 115, Corrected Notice of Allowability mailed Jun. 24, 2021", 2 pgs.
"U.S. Appl. No. 17/218,962, Notice of Allowance mailed Jul. 2, 2021", 8 pgs.
"U.S. Appl. No. 17/218,962, Corrected Notice of Allowability mailed Jul. 12, 2021", 2 pgs.
"U.S. Appl. No. 17/358,154, Non Final Office Action mailed Oct. 20, 2021", 24 pgs.
"U.S. Appl. No. 17/484,817, Non Final Office Action mailed Oct. 29, 2021", 35 pgs.
"U.S. Appl. No. 17/486,426, Non Final Office Action mailed Nov. 22, 2021", 16 pgs.
"U.S. Appl. No. 17/484,817, Response filed Nov. 30, 2021 to Non Final Office Action mailed Oct. 29, 2021", 10 pgs.
"U.S. Appl. No. 17/486,426, Response filed Nov. 30, 2021 to Non Final Office Action mailed Nov. 22, 2021", 10 pgs.
"U.S. Appl. No. 17/388,160, Non Final Office Action mailed Dec. 6, 2021", 24 pgs.
"U.S. Appl. No. 17/394,149, Non Final Office Action mailed Dec. 13, 2021", 18 pgs.
"U.S. Appl. No. 17/462,796, Non Final Office Action mailed Dec. 21, 2021", 18 pgs.
"U.S. Appl. No. 17/486,426, Notice of Allowance mailed Dec. 27, 2021", 9 pgs.
"U.S. Appl. No. 17/484,817, Notice of Allowance mailed Jan. 11, 2022", 10 pgs.
"U.S. Appl. No. 17/358,154, Response filed Jan. 17, 2022 to Non Final Office Action mailed Oct. 20, 2021", 11 pgs.
"U.S. Appl. No. 17/484,817, Corrected Notice of Allowability mailed Jan. 20, 2022", 2 pgs.
"U.S. Appl. No. 17/388,160, Response filed Jan. 28, 2022 to Non Final Office Action mailed Dec. 6, 2021", 10 pgs.
"U.S. Appl. No. 17/394,149, Response filed Jan. 28, 2022 to Non Final Office Action mailed Dec. 13, 2021", 10 pgs.
"U.S. Appl. No. 17/358, 154, Notice of Allowance mailed Feb. 14, 2022", 9 pgs.
"U.S. Appl. No. 17/394, 149, Notice of Allowance mailed Feb. 18, 2022", 9 pgs.
"U.S. Appl. No. 17/358,154, Corrected Notice of Allowability mailed Mar. 2, 2022", 2 pgs.
"U.S. Appl. No. 17/388,160, Notice of Allowance mailed Mar. 2, 2022", 10 pgs.
"U.S. Appl. No. 17/462,796, Response filed Mar. 21, 2022 to Non Final Office Action mailed Dec. 21, 2021", 12 pgs.
"U.S. Appl. No. 17/462,796, Examiner Interview Summary mailed Mar. 22, 2022", 2 pgs.
"U.S. Appl. No. 17/462,796, Notice of Allowance mailed Apr. 20, 2022", 8 pgs.
"U.S. Appl. No. 17/655,124, Non Final Office Action mailed May 4, 2022", 14 pgs.
"U.S. Appl. No. 17/657,019, Non Final Office Action mailed May 24, 2022", 17 pgs.

(56) References Cited

OTHER PUBLICATIONS

"U.S. Appl. No. 17/655,124, Response filed Jul. 19, 2022 to Non Final Office Action mailed May 4, 2022", 10 pgs.
"U.S. Appl. No. 17/655,124, Notice of Allowance mailed Aug. 3, 2022", 9 pgs.
"U.S. Appl. No. 17/657,019, Notice of Allowance mailed Sep. 9, 2022", 10 pgs.
"U.S. Appl. No. 18/534,382, Examiner Interview Summary mailed Dec. 10, 2025", 2 pgs.
"U.S. Appl. No. 18/534,382, Response filed Dec. 15, 2025 to Final Office Action mailed Sep. 15, 2025", 16 pgs.

* cited by examiner

RUNTIME PRUNING FOR TOP K QUERIES

TECHNICAL FIELD

Embodiments of the disclosure relate generally to cloud data platforms and, more specifically, to pruning data while processing top K queries.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a customer account. Indeed, the data platform may include one or more databases that are respectively maintained in association with any number of customer accounts, as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata in association with the data platform in general and in association with, as examples, particular databases and/or particular customer accounts as well.

Users and/or executing processes that are associated with a given customer account may, via one or more types of clients, be able to cause data to be ingested into the database, and may also be able to manipulate the data, add additional data, remove data, run queries against the data, generate views of the data, and so forth.

When certain information is to be extracted from a database, a query statement may be executed against the database data. A data platform may process the query and return certain data according to one or more query predicates that indicate what information should be returned by the query. The data platform extracts specific data from the database and formats that data into a readable form. However, it can be challenging to execute queries on a very large table because a significant amount of time and computing resources are required to scan an entire table to identify data that satisfies the query.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
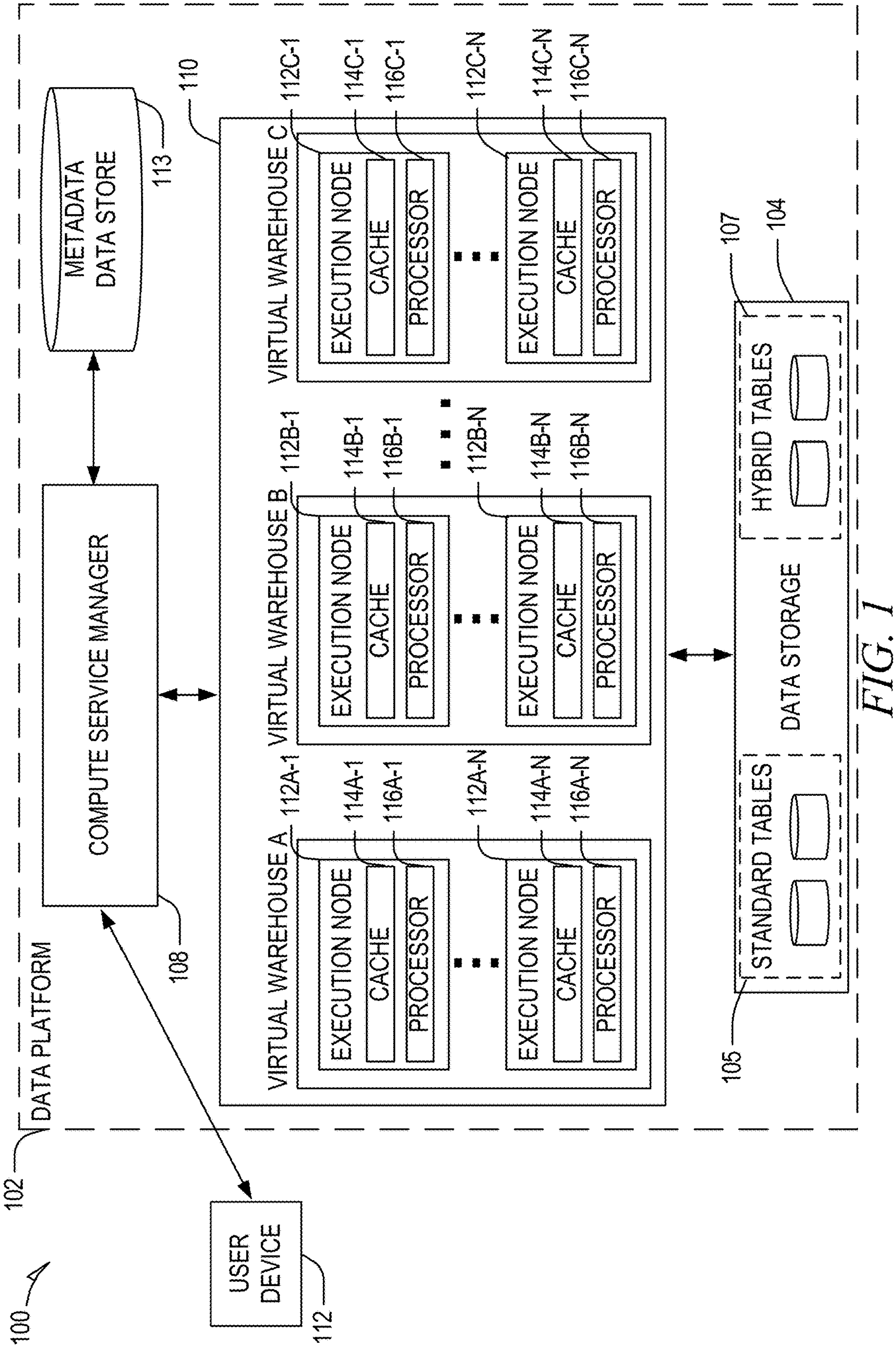
FIG. 1 illustrates an example computing environment that includes a cloud data platform, in accordance with some examples.

Reference will now be made in detail to specific example embodiments for carrying out the inventive subject matter. Examples of these specific embodiments are illustrated in the accompanying drawings, and specific details are set forth in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Database management systems have evolved to handle increasingly complex workloads and data structures. As organizations generate and process larger volumes of data, there is a growing need for systems that can efficiently manage both transactional and analytical operations. This has led to the development of hybrid database architectures that aim to combine the strengths of OLTP and OLAP capabilities. As an example, a hybrid table is a database structure that combines the advantages of both row-based and column-based storage formats to enable efficient data management and query processing for both transactional and analytical workloads in distributed database systems. Hybrid tables support unique and referential integrity constraint enforcement that is useful for transactional workloads.

One of the persistent challenges in database management is optimizing query performance, particularly for operations that involve sorting and limiting large datasets. As noted above, it can be challenging to execute queries on a very large table because a significant amount of time and computing resources are required to scan an entire table to identify data that satisfies the query. Traditional database systems often struggle to provide optimal performance for both transactional and analytical workloads simultaneously. This has led to the exploration of various techniques to improve query execution speed and resource utilization. Some approaches focus on indexing strategies, while others look at query planning and execution optimization To avoid scanning an entire table, a process known as "pruning" is often performed as part of processing queries. Pruning can involve determining which portions of a table are not pertinent to a query, avoiding those non-pertinent portions when responding to the query, and scanning only the pertinent portions to respond to the query. Pruning techniques often utilize metadata that is automatically gathered about all rows stored in a given portion of the table, including: a maximum and minimum value for each of the columns in the portion; a number of distinct values; and/or additional properties used for both optimization and efficient query processing.

A given table may be organized as records (e.g., rows or a collection of rows) that each include one or more attributes (e.g., columns). A data platform may physically store database data (e.g., a table) in multiple storage units, which may be referred to as partitions, micro-partitions, and/or by one or more other names. In an example, multiple storage units of a database can be stored in a block and multiple blocks can be grouped into a single file. That is, a database can be organized into a set of files where each file includes a set of blocks where each block includes a set of more granular storage units such as partitions. Consistent with this example, for a given column, all blocks are stored contiguously and blocks for different columns are row aligned. Data stored in each block can be compressed to reduce its size. A block storing compressed data may also be referred to as a "compression block" herein. Accordingly, pruning may include determining which files, blocks, partitions, micro-partitions or other storage units of a table are not pertinent to a query. It should be understood that the terms "row" and "column" are used for illustration purposes and these terms are interchangeable. Data arranged in a column of a table can similarly be arranged in a row of the table.

A "top K query" refers to a query statement that includes a first clause to sort results of query (also referred to herein as a "result set") in ascending or descending order (e.g., an ORDER BY clause in structured query language [SQL]) and a second clause that limits the result set to a specific number of results (e.g., a LIMIT or LIMIT OFFSET clause in SQL), which is denoted herein as K. Hence, a "top K query" specifies that the result set includes a K number of results in ascending or descending order.

A conventional approach to processing top K queries involves execution of a query plan that includes at least a table scan node and a top K node. Generally, the table scan node scans portions of a table to identify values that may satisfy the query and the table scan node provides the values to the top K node for further processing that includes sorting and filtering based on the first and second clauses. The portions of the table scanned by the table scan node are referred to as the "scanset" and may, for some examples, include one or more rows, one or more partitions (or micro-partitions), one or more partitions groupings (or micro-partition groupings), or other more or less granular portions of the table. In processing rows received from the table scan node, the top K node determines a current boundary that it uses to filter rows received from the table scan node. The current boundary may comprise one or more boundary values. For example, once the top K node has seen K rows, it knows that any row that would be placed behind the Kth row given the sorted order will not be a part of the top K rows and as such, these rows are discarded (filtered). Whenever the top K node identifies a row that would come before the current boundary (corresponding to the last row of the K rows stored in the operator given the ordering), this previous last row is discarded and the current boundary is updated to the new last row of the K rows stored by the operator.

Conventionally, the table scan node does not receive or process any runtime information from the top K node. Although the table scan node may prune the scanset and filter its own output before providing it to the top K node, it does so using only information known prior to initiation of the table scan. Thus, with this conventional approach, the table scan node may identify rows and send them to the top K node so that the top K node may immediately discard via filtering using the current boundary.

Aspects of the present disclosure include a data platform, systems, methods, and devices that improve upon conventional processing of top K queries by utilizing runtime pruning mechanisms (also referred to herein as "top K pruning"). These runtime pruning mechanisms enable the data platform to dynamically calculate and apply boundaries during query execution, potentially reducing the amount of data that needs to be scanned and processed. The runtime pruning operates on both key and non-key columns, providing flexibility in query optimization.

For a key column, the data platform generates a filter (a range expression) at runtime and applies the filter to the scanning process below the table scan to prune the scanset. This pruning can lead to a reduction in the ranges scanned from the database side. In an example, if the current boundary is determined to be 4, the system constructs a range expression to retrieve all values less than or equal to 4, effectively reducing the scan range.

For non-key columns, the approach differs slightly. As values are scanned from the table, the system generates a filter that is applied at the output of table scan node. While this method does not reduce the initial scan range, it can filter the table scan results, potentially reducing the number of values returned to higher-level operators such as the top K node.

Unlike conventional top K query processing techniques in which information is only sent to downstream operators at runtime, with the approach to processing top K queries utilized by the data platform described herein, the table scan node continuously receives information about the current boundary from a top K node in the same pipeline and the quality of this information improves with the amount of data the top K node has processed. By performing runtime pruning, the data platform significantly reduces the amount of data scanned and processed. This approach is particularly effective for hybrid tables, allowing for efficient pruning across different data structures. In addition, the ability to handle both key and non-key columns differently enhances the versatility and effectiveness of the pruning mechanisms. Integration of read-version pruning can further improve the efficiency of the data platform, especially for OLTP workloads with frequent updates, by skipping the scanning of old data versions. Additionally, the adaptive approach of these top K pruning techniques, including features like scanning range sorting and parameterized feature control, allows for fine-tuned optimization based on specific query characteristics and system configurations.

In addition, the top K pruning techniques described herein can also be extended to secondary index scans to broaden the applicability of this query optimization, potentially improving performance for a wider range of query patterns. Secondary indexes are database structures that provide an alternative way to access data in a table, separate from the primary key. They contain a subset of columns from the table, organized in a specific order to facilitate faster data retrieval for certain types of queries. Secondary indexes in hybrid tables can be defined by users and may include unique constraints, making them particularly useful for optimizing query performance when the search criteria or sorting requirements align with the index structure FIG. 1 illustrates an example computing environment 100 that includes a cloud data platform 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the cloud data platform 102 comprises a three-tier architecture: a compute service manager 108 coupled to a metadata data store 113, an execution platform 110, and data storage 104. The cloud data platform 102 hosts and provides data access, management, reporting, and analysis services to multiple client accounts. Administrative users can create and manage identities (e.g., users, roles, and groups) and use permissions to allow or deny access to the identities to resources and services. The cloud data platform 102 is used for reporting and analysis of integrated data from one or more disparate sources including storage devices within the data storage 104. The data storage 104 comprises a plurality of computing machines that provide on-demand data storage to the cloud data platform 102.

The compute service manager 108 includes multiple services that coordinate and manage operations of the cloud data platform 102. For example, the compute service manager 108 is responsible for performing query optimization and compilation as well as managing clusters of compute nodes that perform query processing (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also coupled to the metadata data store 113. The metadata data store 113 stores metadata pertaining to various functions and aspects associated with the cloud data platform 102 and its users. The metadata data store 113 also includes a summary of data stored in data storage 104 as well as data available from local caches. Additionally, the metadata data store 113 includes information regarding how data is organized in the data storage 104 and the local caches.

In an example, the metadata data store 113 can include metadata that includes information about data stored in the table such as minimum and maximum values stored in particular portions of the table. For example, a table may be organized into multiple granular storage units such as micro-partitions. The multiple storage units may be stored (e.g., as files) across multiple blocks (or compression blocks). That is, a block may comprise a set of storage units (e.g., partitions or micro-partitions) and the set of storage units may be a subset of the multiple storage units into which the table is organized. The metadata associated with the table may specify a minimum and maximum value for each storage unit as well as each block. The metadata stored in the metadata data store 113 can be used by one or more components of the data platform 102 to perform pruning during query processing. That is, given a query directed at a table organized into storage units (e.g., a set of micro-partitions), one or more components of the data platform 102 can use the metadata to identify a reduced set of storage units to scan in executing the query. As noted above, the set storage units (e.g., rows, blocks, partitions, partition groupings, etc.) to scan in executing a query are referred to as the scanset.

The compute service manager 108 is also in communication with a user device 112. The user device 112 corresponds to a user of one of the multiple client accounts supported by the cloud data platform 102. In some implementations, the compute service manager 108 does not receive any direct communications from the user device 112 and only receives communications concerning jobs from a queue within the cloud data platform 102.

The compute service manager 108 is further coupled to the execution platform 110, which includes multiple virtual warehouses (computing clusters) that execute various data storage and data retrieval tasks. A set of processes on a compute node executes at least a portion of a query plan compiled by the compute service manager 108. As an example, the compute service manager 108 may generate a query plan for an incoming top K query that includes at least a table scan node and a top K node, though the query plan may include additional upstream, downstream, or intervening operators, depending on the query. The query plan may be embodied in computer-readable instructions for execution by one or more execution nodes of the execution platform 110. That is, the computer-readable instructions may configure any one or more of the execution nodes of the execution platform 110 to be or include any one or more of the table scan node and the top K node. The table scan node scans portions of the table (the scanset) to which the top K query is directed to identify values that may satisfy the top K query and the table scan node provides the identified values to the top K node. The top K node is responsible for sorting and filtering values received from the table scan node and in doing so the top K node determines and continuously updates a current boundary for filtering rows. The table scan node continuously receives information about the current boundary (including one or more boundary values) from the downstream top K node and the table scan node uses the information perform run-time pruning (also referred to as "top-K pruning").

As shown, the execution platform 110 includes virtual warehouse A, virtual warehouse B, and virtual warehouse C. Each virtual warehouse includes multiple execution nodes that each includes a data cache and a processor. For example, as shown, virtual warehouse A includes execution nodes 112A-1 to 112A-N; execution node 112A-1 includes a cache 114A-1 and a processor 116A-1; and execution node 112A-N includes a cache 114A-N and a processor 116A-N. Similarly, in this example, virtual warehouse B includes execution nodes 112B-1 to 112B-N; execution node 112B-1 includes a cache 114B-1 and a processor 116B-1; and execution node 112B-N includes a cache 114B-N and a processor 116B-N. Additionally, virtual warehouse C includes execution nodes 112C-1 to 112C-N; execution node 112C-1 includes a cache 114C-1 and a processor 116C-1; and execution node 112C-N includes a cache 114C-N and a processor 116C-N.

Each execution node of the execution platform 110 is assigned to processing one or more data storage and/or data retrieval tasks. Hence, the virtual warehouses can execute multiple tasks in parallel utilizing the multiple execution nodes. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

In some examples, the execution nodes of the execution platform 110 are stateless with respect to the data the execution nodes are caching. That is, the execution nodes do not store or otherwise maintain state information about the execution node or the data being cached by a particular execution node, in these examples. Thus, in the event of an execution node failure, the failed node can be transparently replaced by another node. Since there is no state information associated with the failed execution node, the new (replacement) execution node can easily replace the failed node without concern for recreating a particular state.

The execution platform 110 may include any number of virtual warehouses. Additionally, the number of virtual warehouses in the execution platform 110 is dynamic, such that new virtual warehouses are created when additional processing and/or caching resources are needed. Similarly, existing virtual warehouses may be deleted when the resources associated with the virtual warehouse are no longer necessary.

Although each virtual warehouse shown in FIG. 1 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary. Additionally, although the execution nodes shown in the example of FIG. 1 each include a single data cache and a single processor, in other examples, execution nodes can contain any number of processors and any number of caches. Also, the caches may vary in size among the different execution nodes.

In some examples, the virtual warehouses of the execution platform 110 operate on the same data, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Although virtual warehouses A, B, and C are illustrated with an association with the same execution platform 110, the virtual warehouses may be implemented using multiple computing systems at multiple geographic locations. For example, virtual warehouse A can be implemented by a computing system at a first geographic location, while virtual warehouses B and C are implemented by another computing system at a second geographic location. In some examples, these different computing systems are cloud-based computing systems maintained by one or more different entities.

The execution platform 110 is coupled to data storage 104. The data storage 104 stores data such as standard tables 105 and hybrid tables 107. Standard tables 105 are primarily designed for analytical workloads and store data in a columnar format organized into multiple storage units (e.g., partitions or micro-partitions), which allows for efficient compression and optimized performance for large analytical queries.

Hybrid tables 107 are optimized for hybrid transactional and operational workloads that require low latency and high throughput on small random point reads and writes. Hybrid tables 107 leverage the strengths of both OLTP and OLAP capabilities, allowing for efficient point lookups and small range scans typical in transactional processing, as well as large-scale analytical queries that may span significant portions of the dataset. Hybrid tables 107 use a row-oriented primary data layout with a secondary columnar storage, enabling better performance for operational queries while still supporting analytical workloads. Hybrid tables 107 implement row-level locking, which allows for more granular concurrency control compared to standard tables 105 that utilize partition or table-level locking mechanisms One of the key features of hybrid tables 107 is their support for enforced unique and referential integrity constraints. Unlike standard tables 105, hybrid tables 107 enforce primary key constraints. This makes hybrid tables 107 suitable for maintaining data integrity in transactional workloads. Additionally, hybrid tables 107 support indexes that are synchronously updated on writes, improving performance for point-lookup operations.

Hybrid tables 107 are designed to work with other features of the data platform 102, allowing users to run hybrid workloads that mix operational and analytical queries. Hybrid tables 107 can be joined with standard tables 105, and queries are executed natively and efficiently in the same query engine without the need for federation. This integration enables atomic transactions across hybrid tables 107 and standard tables 105 without requiring manual orchestration of two-phase commits.

The data storage 104 comprises multiple data storage devices. In some embodiments, the data storage devices are cloud-based storage devices located in one or more geographic locations. For example, the data storage devices may be part of a public cloud infrastructure or a private cloud infrastructure. The data storage devices to may be hard disk drives (HDDs), solid state drives (SSDs), storage clusters, Amazon S3™ storage systems or any other data storage technology. Additionally, the data storage 104 may include distributed file systems (e.g., Hadoop Distributed File Systems [HDFS]), object storage systems, and the like. In some examples, the storage devices are managed and provided by a third-party data storage platform (e.g., AWS®, Microsoft Azure Blob Storage®, or Google Cloud Storage®).

Each virtual warehouse can access any of the data storage devices. Thus, the virtual warehouses are not necessarily assigned to a specific data storage device and, instead, can access data from any of the data storage devices within the data storage 104. Similarly, each of the execution nodes shown in FIG. 1 can access data from any of the data storage devices in the data storage 104. In some examples, a particular virtual warehouse or a particular execution node may be temporarily assigned to a specific data storage device, but the virtual warehouse or execution node may later access data from any other data storage device.

As noted above, table scan nodes and top K nodes are utilized in processing top K queries. Any one or more of the execution nodes of the execution platform 110 may be configured to be or include one or more table scan nodes and/or one or more top K nodes. Accordingly, a table scan node and a top K node may execute on different threads of an execution node, within different threads of the same execution node, or on different execution nodes. Further details regarding the operation of the table scan nodes and the top K nodes are discussed below in reference to FIG. 3.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another.

As shown in FIG. 1, the data storage 104 is decoupled from the computing resources associated with the execution platform 110. This architecture supports dynamic changes to the cloud data platform 102 based on the changing data storage/retrieval needs as well as the changing needs of the users and systems. The support of dynamic changes allows the cloud data platform 102 to scale quickly in response to changing demands on the systems and components within the cloud data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

During typical operation, the cloud data platform 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more execution nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the metadata data store 113 assists the compute service manager 108 in determining which nodes in the execution platform 110 have already cached at least a portion of the data needed to process the task. One or more nodes in the execution platform 110 process the task using data cached by the nodes and, if necessary, data retrieved from the data storage 104.

The compute service manager 108, metadata data store 113, execution platform 110, and data storage 104 are shown in FIG. 1 as individual discrete components. However, each of the compute service manager 108, metadata data store 113, execution platform 110, and data storage 104 may be implemented as a distributed system (e.g., distributed across multiple systems/platforms at multiple geographic locations). Additionally, each of the compute service manager 108, metadata data store 113, execution platform 110, and data storage 104 can be scaled up or down (independently of one another) depending on changes to the requests received and the changing needs of the cloud data platform 102. Thus, in the described embodiments, the cloud data platform 102 is dynamic and supports regular changes to meet the current data processing needs.

As shown in FIG. 1, the computing environment 100 separates the execution platform 110 from the data storage 104. In this arrangement, the processing resources and cache resources in the execution platform 110 operate independently of the data storage devices in the data storage 104. Thus, the computing resources and cache resources are not restricted to specific data storage devices. Instead, all computing resources and all cache resources may retrieve data from, and store data to, any of the data storage resources in the data storage 104.

Figure 2:
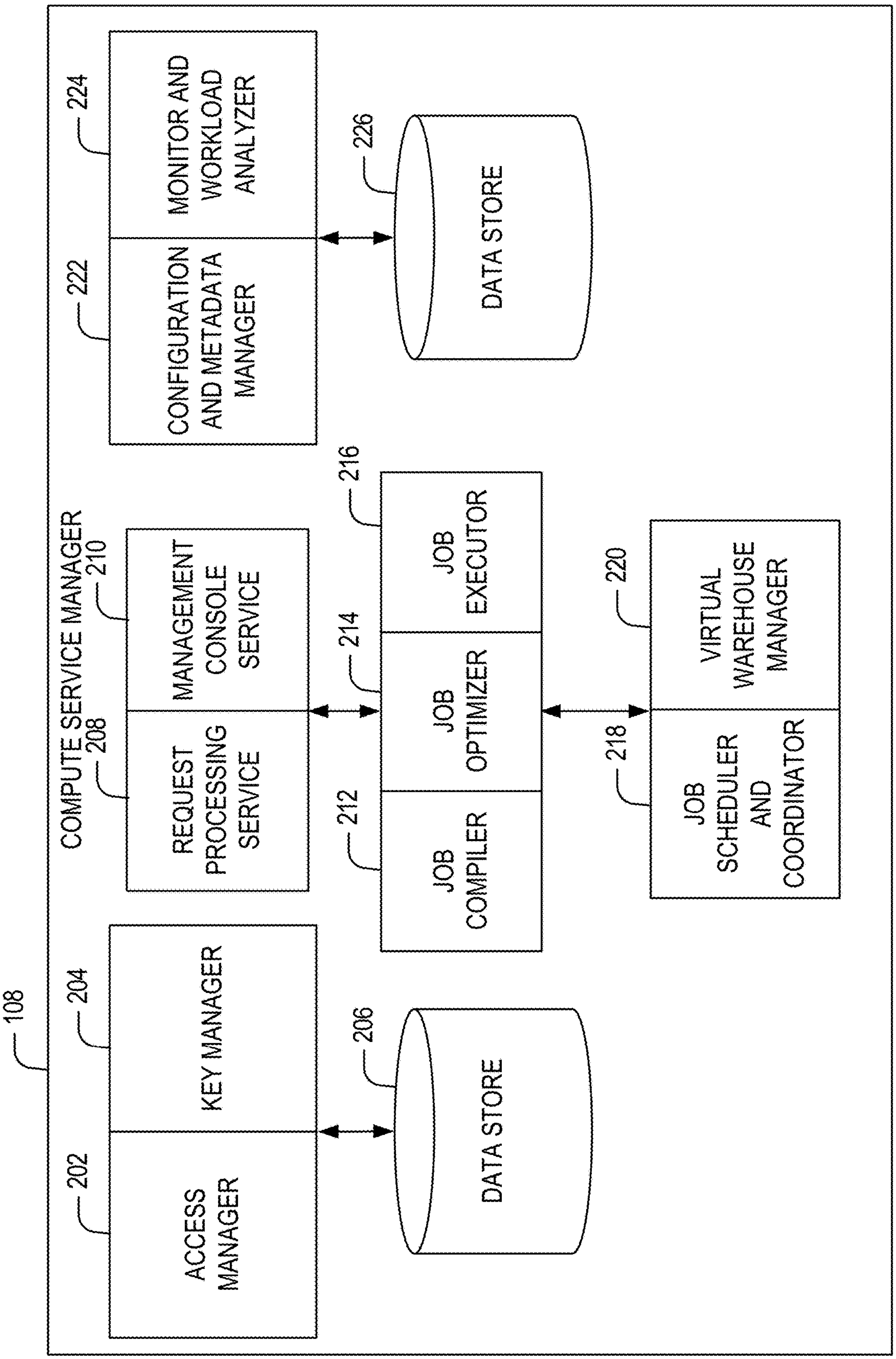
FIG. 2 is a block diagram illustrating components of a compute service manager of the cloud data platform, in accordance with some examples.

FIG. 2 is a block diagram illustrating components of the compute service manager 108, in accordance with some embodiments of the present disclosure. As shown in FIG. 2, the compute service manager 108 includes an access manager 202 and a key manager 204 coupled to a data store 206 that stores access information. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in data storage 104).

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in data storage 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and processed in that prioritized order. In some examples, the job scheduler and coordinator 218 identifies or assigns particular nodes in the execution platform 110 to process particular tasks.

A virtual warehouse manager 220 manages the operation of multiple virtual warehouses implemented in the execution platform 110, any one of which may be configured (e.g., by the virtual warehouse manager 220) to include any one or more of a table scan node and a top K node. As discussed below, each virtual warehouse includes multiple execution nodes that each include a cache and a processor.

Additionally, the compute service manager 108 includes a configuration and metadata manager 222, which manages the information related to the data stored in the remote data storage devices and in the local caches (e.g., the caches in execution platform 110). The configuration and metadata manager 222 uses the metadata to determine which storage units need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the cloud data platform 102 and may further redistribute tasks based on a user (e.g., "external") query workload that may also be processed by the execution platform 110. The configuration and metadata manager 222 and the monitor and workload analyzer 224 are coupled to a data store 226. Data store 226 in FIG. 2 represents any data repository or device within the cloud data platform 102. For example, data store 226 may represent caches in execution platform 110, storage devices in data storage 104, the metadata data store 113, or any other storage device or system.

Figure 3:
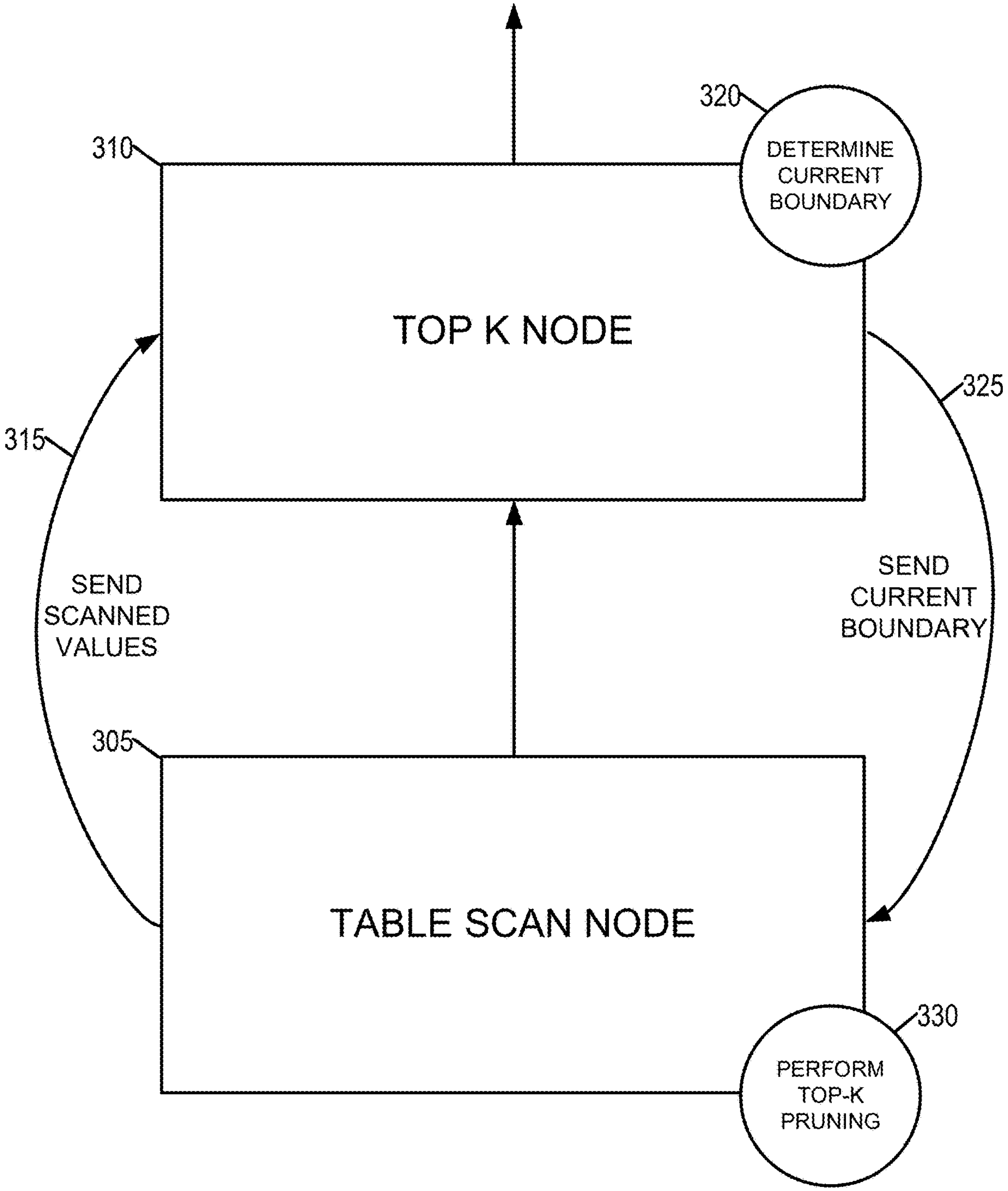
FIG. 3 is a block diagram illustrating example interactions between a table scan node and a top k node in processing a top K query, in accordance with some examples.

FIG. 3 is a block diagram illustrating interactions between a table scan node 305 and a top K node 310 in processing a top K query directed at table, in accordance with some embodiments of the present disclosure. According to some examples, the table to which the top K query is directed is a hybrid table (e.g., one of the hybrid tables 107 discussed above in reference to FIG. 1). As noted above, a hybrid table is a database structure that combines row-based and column-based storage formats, allowing for efficient data management and query processing in distributed database systems supporting both OLTP and analytical workloads. Hybrid tables support multiple versions of data to accommodate frequent updates in OLTP (Online Transaction Processing) workloads. In OLTP environments, data is often modified, inserted, or deleted at a high rate, requiring the data platform 102 to maintain multiple versions of the same data to ensure consistency and support various database operations.

Maintaining multiple versions allows the data platform 102 to: support concurrent transactions (e.g., different transactions can work with different versions of the data simultaneously, improving overall system performance and concurrency); enable time-travel queries (e.g., users can query the state of the data at a specific point in time, which is useful for auditing, debugging, or recovering from errors); facilitate efficient updates (e.g., instead of modifying data in place, the data platform 102 can create new versions, allowing for better performance in write-heavy workloads); and support Multi-Version Concurrency Control (e.g., using data versioning to provide transaction isolation, allowing readers to operate without blocking writers and vice versa).

As noted above, one or more execution nodes of the execution platform 110 can be configured to be or include any one or more of the table scan node 305 and top K node 310. In an example, a query plan for processing the top K query is generated (e.g., by the computer service manager 108) and used to configure the execution platform 110 to include the table scan node 305 and top K node 310. The query plan may be embodied in computer-readable instructions for execution by one or more hardware components (e.g., one or more processors) such as one or more execution nodes of the execution platform 110. That is, the computer-readable instructions may configure any one or more of the execution nodes of the execution platform 110 to be or include any one or more of the table scan node 305 and the top K node 310.

The table scan node 305 and the top K node 310 may, for example, execute on different threads of the same execution node. Though the processing of the top K query may be depicted and described in a certain order, the order in which the described operations of the operators are performed may vary among embodiments, including performing certain operations in parallel or performing sets of operations in separate processes.

The top K query includes a first clause to sort the result set in ascending or descending order (e.g., an ORDER BY clause). The first clause further specifies one or more columns to order, each of which is referred to as an "order by column". The top K query further includes a second clause that limits the number of results in the result set (e.g., a LIMIT clause) to K. Hence, a "top K query" specifies that the result set includes a specific number of results ordered by column in ascending or descending order.

In an example, the table has the following schema:

CREATE HYBRID TABLE t1 (id int primary key, a int, b int);

In this example, "id" is a key column while "a" and "b" are non-key columns of the table. Example top K queries directed at the table are as follows:

1. SELECT * FROM $t1$ WHERE $a = 1$ ORDER BY $id$ $ASC$ LIMIT 3;

2. SELECT * FROM $t1$ WHERE $a = 1$ ORDER BY $b$ $DSC$ LIMIT 4

In the first example top K query, the order by column is "id" (the key column), K is "3" and the result set is to be ordered in ascending order ("ASC"). In the second example top K query, the order by column is "b" (a non-key column), K is "3" and the result set is to be ordered in descending order ("DSC").

The table scan node 305 scans the table to which the top K query is directed to identify values from the table that satisfy the top K query and the table scan node 305 provides the identified values to the top K node 310, at operation 315. For some embodiments, the table scan node 305 may scan only a scanset that includes one or more portions of the table (rather than scanning the entire table). An initial scanset may be predetermined and provided to the table scan node 305 as part of the query plan or the table scan node 305 may determine or refine the scanset based on the query plan. For some examples, the scanset comprises one or more rows of the table that include one or more key value ranges, which are also referred to as "scanning ranges".

The top K node 310 is responsible for sorting and filtering values received from the table scan node 305 in accordance with the first and second clauses in the top K query. That is, the top K node 310 is responsible for sorting values in ascending or descending order based on one or more order-by keys in the top K query and filtering the sorted values such that only K number of values are returned in the result set. In some instances, the top K node 310 sorts values based on multiple orders by columns in opposing directions.

The top K node 310 sorts and filters rows identified by the table scan node 305 as they are received. In doing so, the top K node 310 determines, at operation 320, a current boundary that can be used for run-time pruning. The current boundary may comprise one or more boundary values depending on the number of order by columns specified by the query. That is, the current boundary may comprise a single boundary value in instances in which the top K query includes a single order-by column and in instances in which the top K query includes multiple order-by column, the current boundary may comprise multiple boundary values. The top K node 310 determines and continuously updates the current boundary based on the values received from the table scan node 305.

The top K node 310 can determine the current boundary upon receiving at least K values from the table scan node 305. To assist in determining the current boundary, each instance of the top K node 310 maintains a heap of the K highest or lowest values received from the top scan node 305 so far during query execution, based on the specified ordering criteria from the top K query. The top K node 310 determines the current boundary by checking the heap in all of its instances to determine the highest or lowest value, depending on whether the top K query specifies an ascending or descending order. Whether the top K node 310 identifies the highest or lowest value as the boundary value depends on the ordering specified by the first clause. For example, if the first clause specifies ascending order, the top K node 310 identifies the maximum value from the heaps as the current boundary and if the first clause specifies descending order, the top K node 310 identifies the minimum value from the heaps as the boundary value.

In general, the top K node 310 uses the current boundary to establish a boundary constraint for determining whether an incoming value is to be discarded or included as part of a result set provided by the top K node 310. To determine whether an incoming value received from the table scan node 305 satisfies the boundary constraint, the top K node 310 compares the incoming value to the current boundary. As an example in which the current boundary includes a single boundary value, if the first clause specifies ascending order, the top K node 310 discards an incoming value received from the table scan node 305 if the value in the value is equal to or greater than the boundary value. Otherwise, the value satisfies the boundary constraint and the top K node 310 includes the incoming row as part of the possible result set and updates the boundary value based on the inclusion of the incoming value.

As another example where the current boundary includes a single boundary value, if the first clause specifies descending order, the top K node 310 discards an incoming value received from the table scan node 305 if the value is equal to or less than the current boundary value. Otherwise, the value satisfies the boundary constraint and the top K node 310 includes the incoming value as part of the possible result set and updates the boundary value based on the inclusion of the incoming value.

In addition to using the current boundary in the manner set forth above, as shown, at operation 325, the top K node 310 provides the current boundary to the table scan node 305 while the table scan node 305 continues to scan the table. The table scan node 305 uses the current boundary to perform top K pruning, at operation 330, while continuing to scan the table. For top K queries where the order by column is a key column of the table such as in the first example top K query set forth above, the top K pruning performed by the table scan node 305 includes pruning the scan set based on the current boundary to reduce the number of ranges to be scanned. In pruning the scanset, the table scan node 305 generates a filter (e.g., comprising a range expression) based on the current boundary and compares the filter to metadata that includes information about the table such as minimum and maximum values stored by certain portions of the table. For example, the multiple storage units into which the table is divided may be distributed among multiple blocks and the metadata may indicate a range of values (as defined by a minimum and maximum value) stored by each block, each storage unit, and/or other more or less granular portions of the table. In pruning the scanning ranges using the current boundary, the table scan node 305 removes one or more portions of the table (e.g., one or more rows) corresponding to one or more scanning ranges (key value ranges) from the scanset that are determined to not store any values that may be included in the result set based on the filter (e.g., the ranges in the portion of the table do not include any values that would satisfy the boundary constraint).

For top K queries where the order by column is a non-key column of the table such as in the second example top K query set forth above, the top K pruning performed by the table scan node 305 includes filtering scanned values based on the current boundary before sending to the top k node 310. That is, the table scan node 305 uses the current boundary to generate a filter and uses the filter to eliminate values identified based on the table scan that do not satisfy the boundary constraint established by the current boundary.

In some examples, the top K pruning performed by the table scan node 305 includes using the filter generated based on the current boundary to avoid a scan of certain value ranges from the table based on metadata describing the table. For example, the table scan node 305 can decide to skip the read of a current range (e.g., corresponding to a particular portion of the table) if the range specified by the column metadata does not overlap with the current boundary.

In addition to these pruning techniques, the table scan node 310 may also use the current boundary to perform read-version pruning as part of or in conjunction with the top K pruning at operation 330. Read-version pruning is an optimization technique that leverages the current boundary value determined by the top K node to potentially prune older versions of the table (or portions thereof) from the scanset. This process works in conjunction with execution plan metadata, which is generated periodically during table compaction. The table scan node compares the current boundary value against the metadata for each scanning range (each key-value range being scanned). If the current boundary value indicates that all data in a scanning range is outside the range of potentially relevant results, the table scan node prunes that scanning range for versions up to the metadata generation time. This allows the system to scan only data that has been added or modified since the last metadata generation, potentially reducing the amount of data processed.

As additional rows are received, the top K node 310 continues to update the current boundary (e.g., by determining updated boundary values) and provide the updated current boundary to the table scan node 305, and the table scan node 305, in turn, continues to prune the scanning ranges using updated current boundary and in some instances, filter out values identified from the table scan.

For some examples, the table scan node 305 may sort the scanning ranges of the scanset prior to initiating the scan. Consistent with these examples, the table scan node 305 may use metadata that includes information about minimum and maximum values stored by each portion of the table to sort the scanset based on the order by column. Whether the table scan node 305 sorts the scanset in ascending or descending order is based on whether the top K query specifies that results are to be ordered in ascending or descending order. For example, if the top K query specifies an ascending order, the table scan node can scan the files with the lowest values first to allow the top K node to determine an initial current boundary that is more selective.

Consistent with some examples, in addition to the pruning techniques discussed above, the data platform 102 can also utilize secondary indexes to optimize processing of top K queries. A secondary index is an auxiliary data structure used with tables (e.g., key-value tables) to improve the performance of lookups, updates, and constraint enforcement on non-primary key columns. A secondary index is stored as separate key-value pairs in the same data store as the primary table with a linkage thereto. Secondary indexes enable fast retrieval of primary key(s) for records satisfying user-defined properties on non-key columns, significantly enhancing query performance for operations that would otherwise require full table scans.

The implementation of secondary indexes involves creating a complementary key-value table that maps indexed column values to their corresponding primary keys. This allows for efficient access to data based on non-primary key columns, while maintaining the ability to retrieve all necessary information from the base table. Secondary indexes are particularly useful for enforcing uniqueness constraints, referential integrity, and improving the execution of queries with predicates on non-primary key columns. They are managed as nested objects within a metadata framework of the data platform 102, inheriting access rights from the base table and providing a flexible mechanism for optimizing both transactional (OLTP) and analytical (OLAP) workloads in hybrid database systems.

For top K queries, the data platform 102 evaluates the suitability of available secondary indexes based on factors like whether the order-by columns form a prefix sequence of the index. If a suitable secondary index is selected, the data platform 102 applies a limit hint to a secondary index scan operator, allowing it to stop scanning once the specified limit is reached. The secondary index scan leverages the sorted order of the index, similar to the primary key, to efficiently retrieve and filter data. If the index does not contain all required columns, the data platform 102 probes the main table to fetch additional data. Top-K pruning can then be applied to the results of the secondary index scan, further optimizing query processing.

Depending on the embodiment, the query plan may specify additional upstream, downstream, or intervening operators not shown. For example, a second top K node that is downstream from the top K node 310 may also be utilized to process the top K query. Consistent with these embodiments, a downstream top K node can collect the output of multiple top K nodes (e.g., from different threads and/or machines) to ensure only the top K values are actually returned.

FIGS. 4-7 are flow diagrams illustrating operations of the cloud data platform in performing a method 400 for processing a top K query, in accordance with some embodiments of the present disclosure. The method 400 may be embodied in computer-readable instructions for execution by one or more hardware components (e.g., one or more processors) such that the operations of the method 400 may be performed by components of data platform 102. Accordingly, the method 400 is described below, by way of example with reference thereto. However, it shall be appreciated that the method 400 may be deployed on various other hardware configurations and is not intended to be limited to deployment within the data platform 102.

Depending on the embodiment, an operation of the method 400 may be repeated in different ways or involve intervening operations not shown. Though the operations of the method 400 may be depicted and described in a certain order, the order in which the operations are performed may vary among embodiments, including performing certain operations in parallel or performing sets of operations in separate processes or separate threads.

At operation 405, the data platform 102 receives a top K query directed at a table. In some examples, the table is one of the hybrid tables 107. As noted above, a top K query requests the top K rows from the table, ordered by a specific column (the "order by column") in ascending or descending order.

At operation 410, the data platform 102 initiates the execution of the top K query by the execution platform 110. In initiating the execution of the top K query, the data platform 102 configures one or more execution nodes of the execution platform 110 to be or to include at least a table scan node and a top K node to execute the top K query on the table. In some examples, the data platform 102 generates a query plan for executing the query. The query plan comprises a set of instructions for executing the top K query on the table. In some examples, the execution platform 110 generates the query plan based on an execution plan generated by the compute service manager 108. The execution plan comprises metadata about the table and specifies one or more files (e.g., comprising one or more portions of the table) along with one or more actions to perform to process the query. Consistent with these examples, the configuring of the one or more execution nodes to include at least the table scan node and the top K node is based on the query plan.

In some examples, the initiating of the execution of the top K query comprises determining whether run-time pruning (top-K pruning) can be applied to the top K query. The data platform 102 can determine whether run-time pruning can be applied to the top K query based on the table scan node being a child or dependent child of the top k node. Based on determining that the run-time pruning can be applied to the top K query, the execution platform 110 adds a reference to the top K node in the table scan node that enables the table scan node to obtain boundary information from the top K node at run-time and constructs column metadata for the order by column.

At operation 415, the table scan node determines a scanset from the table to scan for data that satisfies the top K query. The scanset includes a subset of storage units of the table. In some examples, the scanset corresponds to a set of scanning ranges that may be a subset of key value ranges of the table that may be stored across one or more portions of the tables. For example, the scanning ranges may be stored in a subset of the storage units from the table (e.g., one or more storage units). For some examples, the determining of the scanset may be performed as part of generating a query plan.

At operation 420, a table scan node (e.g., table scan node 305) of the data platform 102 identifies an initial set of values from the table that satisfy the top K query by scanning portions of the table corresponding to the scanset. The table scan node, at operation 425, provides the initial set of values to a top K node of the data platform 102 (e.g., top K node 310) while continuing to scan. The initial set of values includes at least K values.

At operation 430, the top K node determines a current boundary based on the initial set of values. The current boundary comprises a value from the initial set of values. To assist in determining the current boundary, each instance of the top K node maintains a heap of the K highest or lowest values received from the top scan node so far during query execution, based on the specified ordering criteria from the top K query. The top K node determines the current boundary by checking the heap in all of its instances to determine extrema value. The top K node identifies either the highest or lowest value depending on whether the top K query specifies an ascending or descending ordering.

Figure 6:
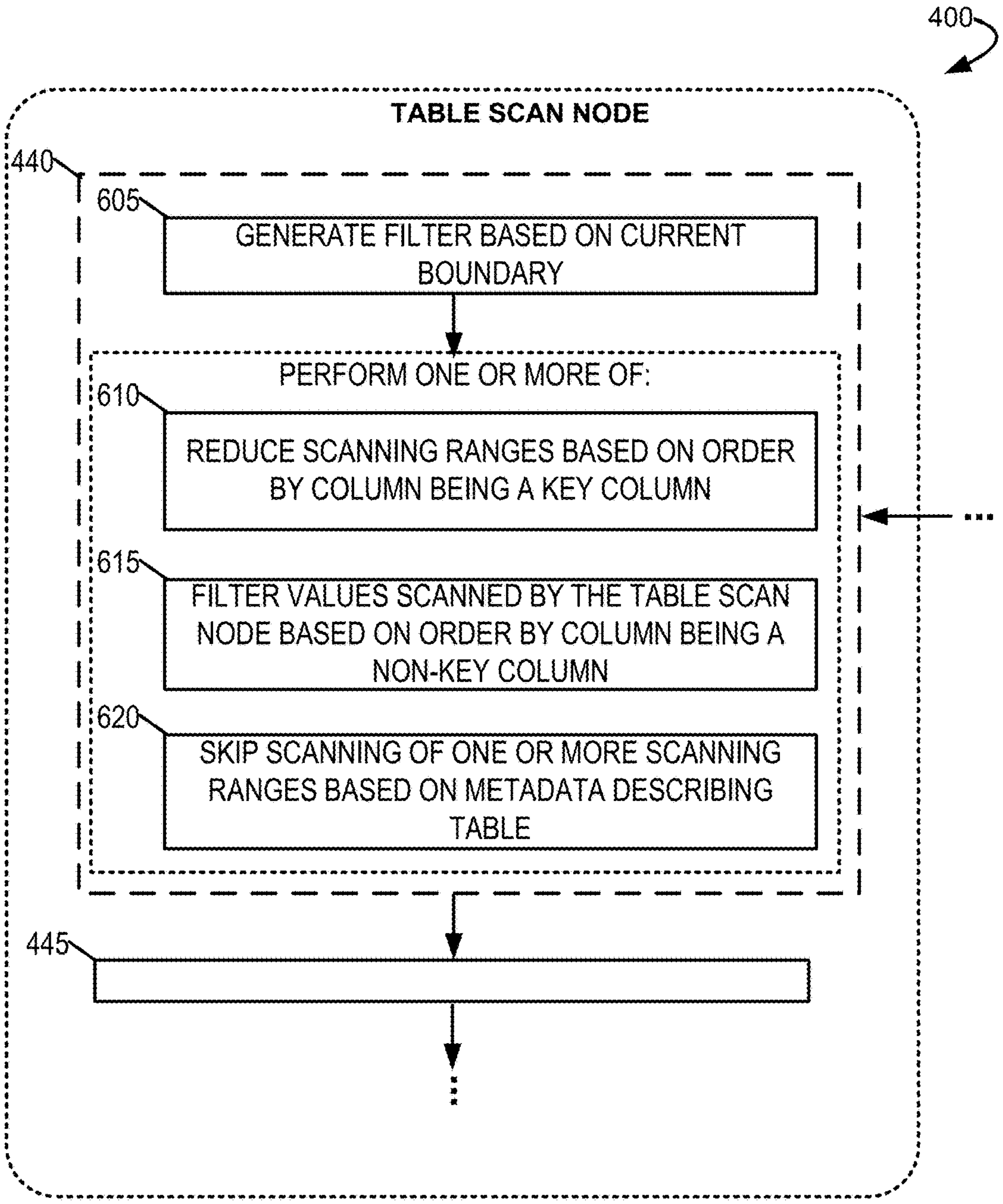

At operation 435, the top K node provides the current boundary to the table scan node. In turn, the table scan node uses the current boundary to perform top-K (run-time) pruning, at operation 440. As shown in FIG. 6, the operation 440 can include one or more of operations 605, 610, 615, and 620. At operation 605, the table scan node generates a filter (e.g., comprising a range expression) based on the current boundary for use in pruning during scanning. The manner in which the table scan node uses the filter to perform the pruning depends on whether the order by column is a key column or a non-key column. If the order by column is a key column, the table scan node uses the filter to reduce the scanning ranges, at operation 610. For example, the table scan node applies the filter to the scanset to remove one or more portions of the table corresponding to one or more scanning ranges from the scanset. In this way, the pruning of the scanset can result in a pruned scanset with reduced scanning ranges. Consistent with some examples, the table scan node may prune the one or more portions from the scanset based on a comparison of the filter (based on the current boundary value) to metadata associated with the table.

If the order by column is a non-key column of the table, the table scan node uses the filter to filter out values scanned from the table before the scanned values are provided to the top K node for further processing (operation 615). As an example, the table scan node can identify a second set of values that satisfy the top K query based on the continued scanning of the table, and the table scan node may discard (filter out) one or more values from the second set of values by applying the filter to the second set of values, thereby resulting in a subset of the second set of values, which is then provided to the top K node.

In some examples, the table scan node may also use the filter to skip the scan of one or more ranges from the scanset based on the current boundary (operation 620). As an example, the table scan node can load a portion of the table (e.g., one or more files, blocks, or storage units) identified by the scanset, compare metadata describing a minimum and maximum value stored by the portion of the table against the current boundary, and discards the portion of the table based on the comparison, thereby skipping the scanning of the range of values stored by the portion of the table.

The table scan node also incorporates special handling for null values during top K pruning. For non-key columns, the table scan node includes additional logic to allow null-valued rows to pass through the filter without being pruned. This is particularly useful when the query specifies "NULLS FIRST" ordering and the column is nullable. The table scan node combines the filter with an "IS NULL" expression using an OR predicate to ensure that null values are properly considered during pruning. For primary key columns, the table scan node checks if the current boundary value is null or if the order by column specifies "NULLS FIRST" for a nullable data type. In these cases, pruning is not applied to avoid incorrectly filtering out relevant null values. This null-value handling ensures that the top K pruning correctly processes queries involving null values, maintaining result accuracy while still benefiting from pruning optimizations.

Figure 4:
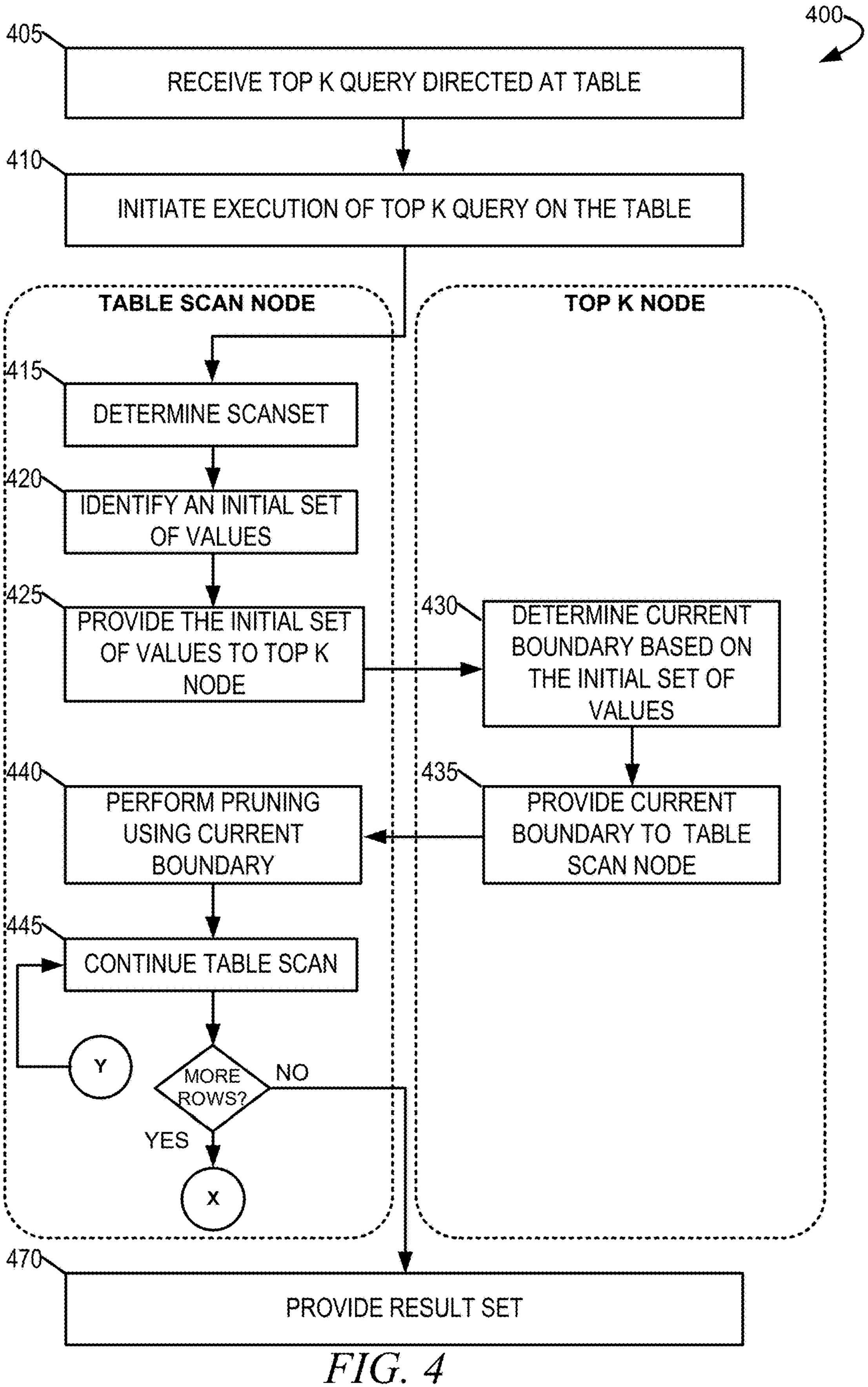
FIGS. 4-7 are flow diagrams illustrating operations of the cloud data platform in performing a method for processing a top K query, in accordance with some examples.
Figure 5:
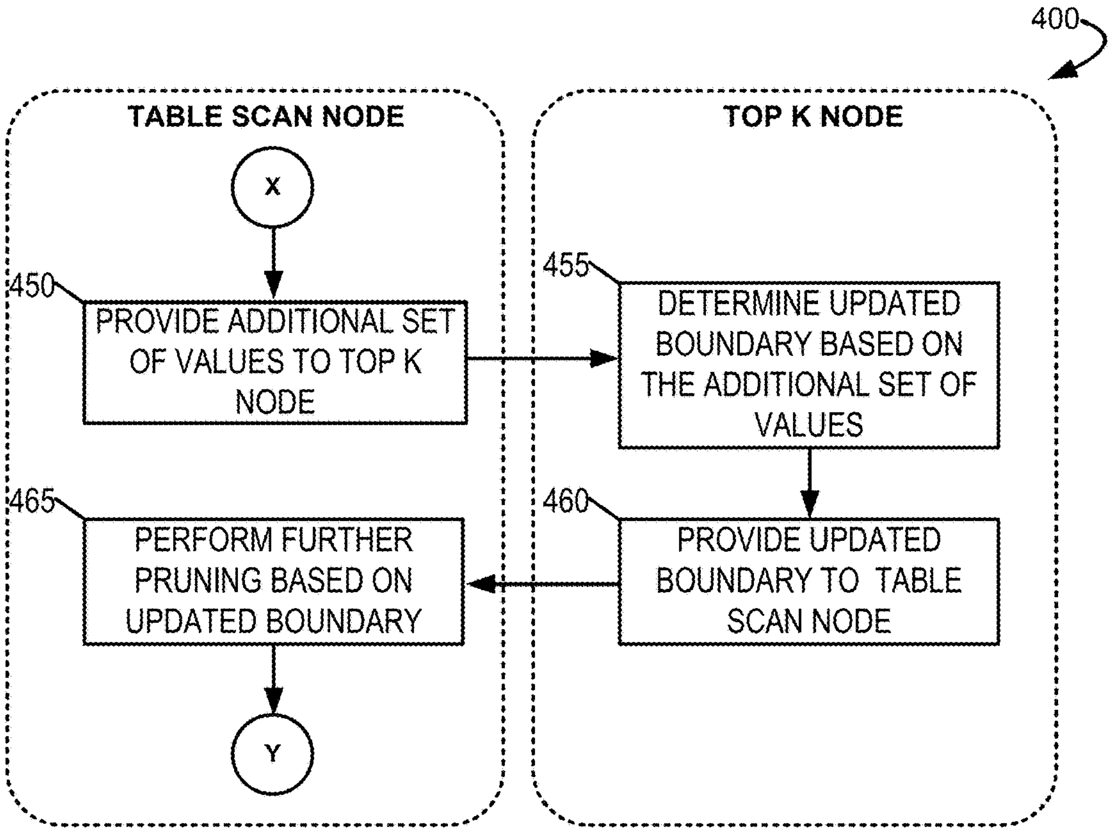

With returned reference to FIG. 4, the table scan node continues to scan the scanset to identify values that may satisfy the query (operation 445). As shown in FIG. 5, the table scan node may identify an additional set of values (e.g., a second set of values) by scanning the table (e.g., scanning one or more portions of the reduced scanset) and provide the additional set of values to the top K node, at operation 450. As noted above, in instances in which the order by column is a non-key column of the table, the additional set of values are filtered by the table scan node using the filter generated based on the current boundary prior to being sent to the top K node.

The top K node, at operation 455, determines an updated boundary based on the additional set of values, and provides the updated boundary to the table scan node, at operation 460. In determining the updated boundary, the top K node determines an updated boundary value from the heap of each instance of the top K node.

The table scan node uses the updated boundary value to perform further runtime pruning, at operation 465 (e.g., by further reducing scanning ranges, filtering scanned values, and/or skipping the scan of certain ranges). Upon further performing further run-time pruning, the method 400 returns to operation 445 where the table scan node continues to scan the table to identify additional values (e.g., a third set of rows) that may satisfy the query.

If the table scan node does not identify any further values at operation 445, the method may proceed to operation 470 (shown in FIG. 4) where the data platform 102 provides the result set responsive to the top K query. The result set includes one or more values identified from the table that satisfy the top K query. The one or more rows may be based on rows identified by the table scan node, and processed by the top K node as well as any other downstream nodes that provide processing in accordance with the top K query.

Figure 7:
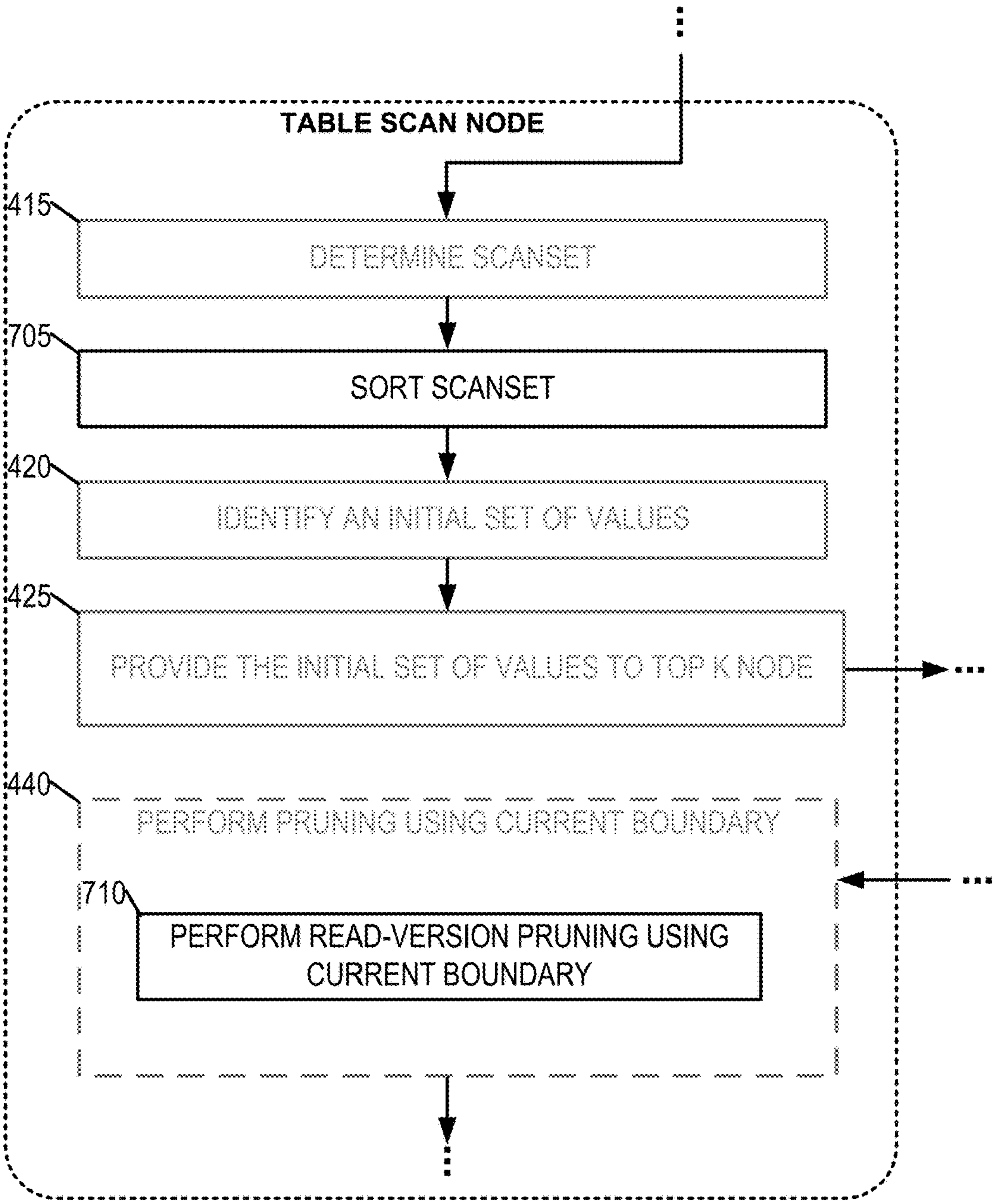

As shown in FIG. 7, the method 400 may, in some examples, further include operations 705 and 710. Consistent with these examples, the operation 705 may be performed prior to operation 420 where the table scan node begins the scan of the table and identifies an initial set of values therefrom. At operation 705, the table scan node sorts the scanning ranges of the scanset to improve the efficiency of the run-time pruning mechanisms. The sorting of scanning ranges is based on the order by column(s) specified in the ORDER BY clause of the top-K query. For example, if the query specifies an ascending order, the table scan node sorts scanning ranges in ascending order based on the minimum values of the key column(s) in each range. Conversely, if the query specifies a descending order, the ranges are sorted in descending order.

Sorting the scanning ranges in this manner can establish a more selective boundary value earlier in the query execution process. This is particularly beneficial because it allows the table scan node to prune larger portions of data more quickly, reducing the overall amount of data that needs to be scanned and processed. Consistent with some examples, rather than sorting all scanning ranges, the table scan node sorts only the first few scanning ranges of the scanset to create an approximately good current boundary value without incurring the cost of sorting all scanning ranges, which can be computationally expensive.

The sorted scanning ranges are then processed in the optimized order during the subsequent scanning operations. This sorting step works in conjunction with other Top-K pruning techniques, such as runtime boundary updates and read-version pruning, to further enhance query performance.

Consistent with these examples, the operation 710 can be performed prior to, as part of, in parallel with, or subsequent to the operation 440 where the table scan node performs the run-time pruning using the current boundary. Consistent with these examples, the scanset comprises scanning ranges for multiple versions of the table (including a current and older versions of the table).

At operation 710, the table scan node performs read-version pruning using the current boundary. Read-version pruning leverages the current boundary determined by the Top-K node to potentially avoid scanning older versions of the table. This operation is an optimization technique that particularly applicable to OLTP workloads where data is frequently updated.

In performing read-version pruning, the table scan node checks if there is metadata available for the scanning ranges in the scanset, and if metadata exists, the table scan node compares the current boundary against the metadata for each scanning range. The metadata includes information about the minimum and maximum values for each column in a given scanning range at the time the metadata was generated. If the current boundary value indicates that all data in a particular version of the table is outside the range of potentially relevant results, the table scan node prunes scanning ranges for versions of the table up to the metadata generation time of the particular version of the table (including the scanning ranges from the particular version of the table). By pruning older versions of the table that are outside the Top-K result set, the table scan node can improve query performance, especially for queries on tables with a high rate of updates.

Consistent with some examples, the read-version pruning is applied at the instance level, meaning that after each update of the current Top-K boundary, the table scan node can decide whether to prune the next scanning range or not, allowing for dynamic optimization as the query execution progresses.

In performing the read-version pruning, the table scan node prunes only older versions of data, not newer ones, because the metadata is generated periodically, and the system cannot make assumptions about data that has been added or modified since the last metadata generation. Read-version pruning can lead to performance improvements by reducing the amount of data that needs to be scanned and processed during query execution, but the effectiveness can vary depending on factors such as the frequency of metadata generation, the rate of data updates, and the nature of the Top-K query.

Figure 8:
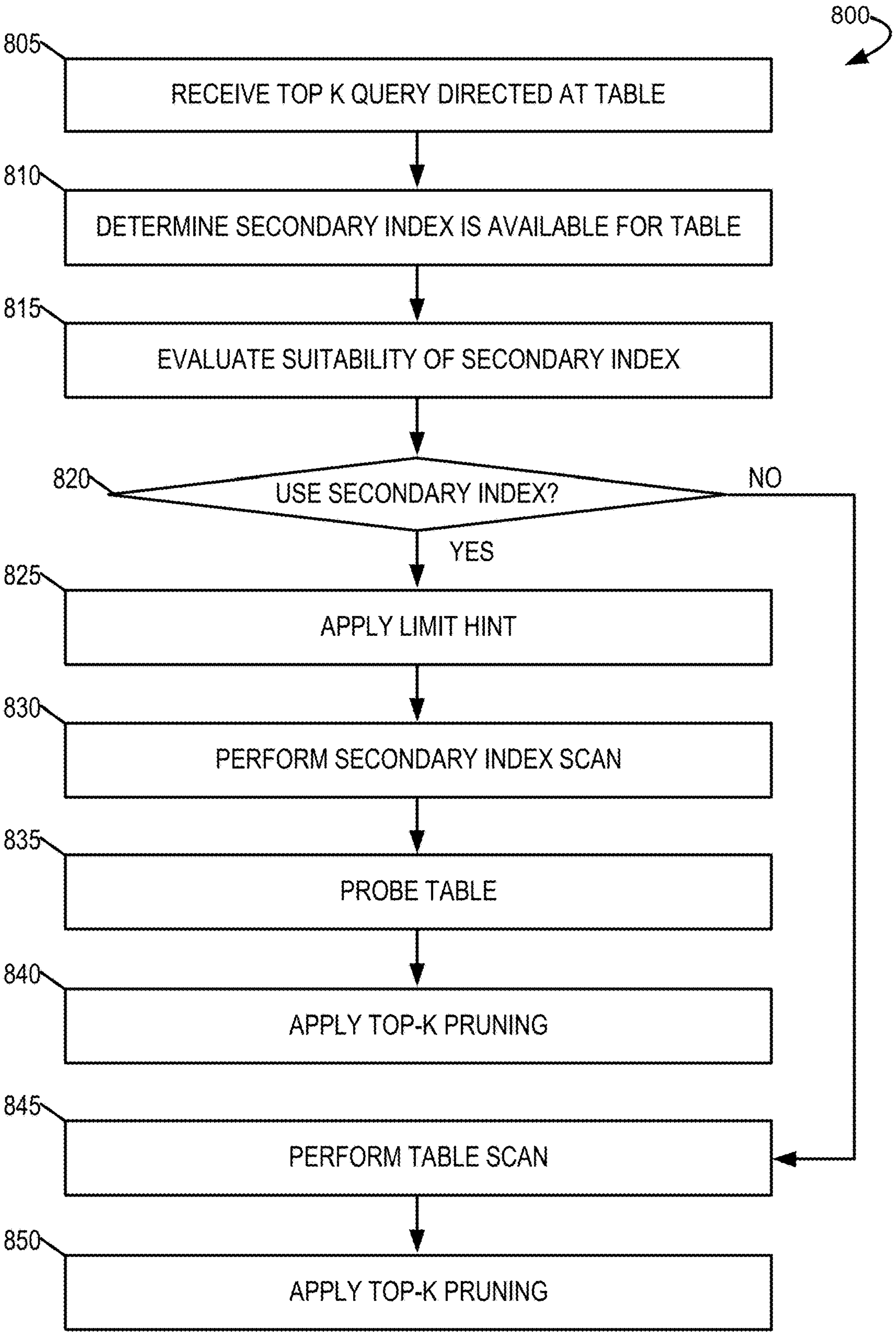
FIG. 8 is a flow diagram illustrating operations of the cloud data platform in performing a method for processing a top K query using a secondary index, in accordance with some examples.

FIG. 8 is a flow diagram illustrating operations of the cloud data platform in performing a method 800 for processing a top K query using a secondary index, in accordance with some examples. The method 800 may be embodied in computer-readable instructions for execution by one or more hardware components (e.g., one or more processors) such that the operations of the method 800 may be performed by components of data platform 102. Accordingly, the method 800 is described below, by way of example with reference thereto. However, it shall be appreciated that the method 800 may be deployed on various other hardware configurations and is not intended to be limited to deployment within the data platform 102.

Depending on the embodiment, an operation of the method 800 may be repeated in different ways or involve intervening operations not shown. Though the operations of the method 400 may be depicted and described in a certain order, the order in which the operations are performed may vary among embodiments, including performing certain operations in parallel or performing sets of operations in separate processes or separate threads.

At operation 805, the data platform 102 receives a top K query directed at a table. The data platform 102 determines a secondary index is available for the table (operation 810). A secondary index is a database structure that provides an alternative way to access data in a table, separate from the primary key. The secondary index contains a subset of columns from the table, organized in a specific order to facilitate faster data retrieval for certain types of queries. Secondary indexes in hybrid tables can be defined by users and may include unique constraints. Secondary indexes are particularly useful for optimizing query performance when the query's search criteria or sorting requirements align with the index structure. In the context of top K queries, secondary indexes can potentially improve query execution by allowing the data platform 102 to access relevant data more efficiently, especially when the order by column(s) form(s) a prefix sequence of the index or when the index covers all columns needed for query processing.

At operation 815, the data platform 102 evaluates the suitability of the secondary index for processing the top K query. The evaluation considers factors such as whether the order by columns form a prefix sequence of the index, if all predicates and order by columns are in consecutive order within the index, and if the index is a covering index that includes all columns needed for query processing.

At operation 820, the data platform 102 decides whether to use the secondary index based on the evaluation. If the secondary index is selected for use, the data platform 102 applies a limit hint to the index scan, at operation 825. The limit hint is a parameter that informs a secondary index scan operator about the maximum number of rows it needs to process. This hint allows the scan operator to stop scanning once it has reached the specified limit, potentially reducing the number of ranges that need to be scanned. The limit hint is particularly beneficial for top K queries with small K values, as it can significantly reduce the amount of data that needs to be processed. By applying this hint, the data platform 102 optimizes the index scan process, focusing only on the most relevant data for the top K query.

The effectiveness of the limit hint depends on the ability to evaluate all pushed filters within the secondary index scan operator. To ensure correctness, all predicate columns and top K columns need to be within the same index. This requirement allows the data platform 102 to accurately determine when it has retrieved enough data to satisfy the top K query without unnecessarily scanning additional ranges.

At operation 830, the data platform 102 performs a secondary index scan using the applied limit hint. The secondary index scan takes advantage of the fact that the index is stored in a sorted order, allowing for optimized data access patterns. This sorted order enables the scan to potentially stop early once it has retrieved the number of rows specified by the limit hint, reducing the overall amount of data that needs to be processed. During the secondary index scan, the operator evaluates any pushed filters within the index itself. This evaluation occurs before accessing the main table data, which can significantly reduce the amount of data that needs to be retrieved and processed. The ability to evaluate filters within the index is particularly beneficial for top K queries, as it allows for the early elimination of rows that do not meet the query criteria.

The secondary index scan operator also supports reverse scanning, which is useful for top K queries that require descending order. This capability allows the data platform 102 to efficiently process queries regardless of the specified sort direction.

At operation 835, the data platform 102 probes the table to retrieve additional information, as needed. Operation 835 is performed when the index does not contain all the columns needed to satisfy the query. The index may not contain all the necessary columns for several reasons. For example, while some indexes are designed as covering indexes that include all columns needed for query processing, not all indexes are created this way. A non-covering index contains only a subset of the columns from the table, typically those used for filtering and sorting. As another example, the query may request columns that are not part of the index, such as when a SELECT * statement is used, requiring all columns from the table while the index may only contain a subset of these columns. As yet another example, index design involves trade-offs, as including all possible columns in every index would lead to increased storage requirements and slower write operations. Therefore, indexes are often designed to balance query performance with storage and maintenance costs. As still yet another example, query patterns may change over time, and an index created for one set of query patterns may not include all columns needed for new query patterns. When the index does not contain all required columns, the data platform 102 must perform this additional probing step to retrieve the missing data from the main table. This process involves using the row identifiers or primary key values obtained from the index to locate and fetch the corresponding full rows from the main table.

At operation 840, the data platform 102 applies top-K pruning to the results of the secondary index scan, in accordance with the top K pruning techniques described herein.

At operation 845, if the secondary index is not used, the data platform 102 performs a table scan on the main table. At operation 850, the data platform 102 applies top-K pruning to the results of the table scan, in accordance with the top K pruning techniques described herein.

In view of the disclosure above, various examples are set forth below. It should be noted that one or more features of an example, taken in isolation or combination, should be considered within the disclosure of this application.

Example 1 is a method comprising: receiving a top K query directed at a table, the top K query comprising a first clause to sort a result set in an order based on a column of the table and a second clause that specifies a limit on a number of results provided in the result set; initiating execution of the top K query on the table; determining, by a top K node, a current boundary based on a set of values identified by a table scan node in scanning the table; performing run-time pruning during execution of the top K query on the table using the current boundary, the run-time pruning comprising: removing one or more scanning ranges from a scanset of the table scan node based on the column being a key column of the table; or filtering values scanned by the table scan node based on the column being a non-key column of the table; and returning the result set based on the run-time pruning performed during execution of the top K query on the table.

In Example 2, the subject matter of Example 1, wherein: the column is the key column of the table; and the performing of the run-time pruning comprises generating, by the table scan node, a filter based on the current boundary; and the removing of the one or more scanning ranges comprising applying, by the table scan node, the filter to the scanset during the scanning of the table to remove the one or more scanning ranges from the scanset.

In Example 3, the subject matter of Examples 1-2, wherein: the set of values is a first set of values identified by the table scan node in scanning the table; the column is a non-key column of the table; and the performing of the run-time pruning comprises generating, by the table scan node, a filter based on the current boundary; and the filtering of values comprises applying the filter to a second set of values identified in scanning the table, the applying of the filter to the second set of values comprising discarding at least one value from the second set of values; the method comprises providing, by the table scan node, the filtered second set of values to the top k node.

In Example 4, the subject matter of Examples 1-3, wherein the run-time pruning comprises skipping a scan of a range of values in the scanset based on metadata describing the table.

In Example 5, the subject matter of Examples 1-4, wherein: the set of values is a first set of values identified by the table scan node in scanning the table; the performing of the run-time pruning comprises: determining, by the top K node, an updated boundary based on a second set of values identified by the table scan node in scanning the table; and applying, by the table scan node, the updated boundary to further prune data during the scanning of the table.

In Example 6, the subject matter of Examples 1-5, wherein the table scan node filters the second set of values based on the current boundary prior to sending the second set of values to the top K node.

In Example 7, the subject matter of Examples 1-6, comprising performing, by the table scan node, read-version pruning using the current boundary during the scanning of the table.

In Example 8, the subject matter of Examples 1-7, wherein: the scanset comprises scanning ranges from multiple versions of the table; performing the read-version pruning comprises: comparing the current boundary against metadata for each scanning range in the scanset; determining, based on the comparing, that all data in a particular version of the table is outside a range of potentially relevant results; and pruning scanning ranges from the particular version of the table from the scanset based on the determining that all the data in the particular version of the table is outside the range of potentially relevant results.

In Example 9, the subject matter of Examples 1-8, comprising sorting the scanning ranges of the scanset prior to performing the run-time pruning.

In Example 10, the subject matter of Examples 1-9, wherein sorting the scanning ranges comprises sorting the scanning ranges based on the key column of the table and the first clause of the query.

In Example 11, the subject matter of Examples 1-10, wherein the determining of the current boundary comprises: maintaining a heap of top-K values in the top K node, the heap of top-K values storing values scanned from the table by the table scan node; and determining the current boundary based on an extrema value in the heap of top-K values.

In Example 12, the subject matter of Examples 1-11, wherein the initiating of the execution of the top K query comprises: determining that the run-time pruning is applicable to the top K query; based on determining that the run-time pruning is applicable to the top K query, adding a reference to the top K node in the table scan node, the reference enabling the table scan node to request the current boundary from the top K node at run-time; and constructing column metadata for the column.

In Example 13, the subject matter of Examples 1-12, wherein: the first clause comprises an ORDER BY clause in structured query language (SQL); and the second clause comprises a LIMIT clause in SQL.

Example 14 is a system comprising: at least one hardware processor; and at least one memory storing instructions that cause the at least one hardware processor to perform operations comprising: receiving a top K query directed at a table, the top K query comprising a first clause to sort a result set in an order based on a column of the table and a second clause that specifies a limit on a number of results provided in response to the query; initiating execution of the top K query on the table; determining, by a top K node, a current boundary based on a set of values identified by a table scan node in scanning the table; performing run-time pruning during execution of the top K query on the table using the current boundary, the run-time pruning comprising: removing one or more scanning ranges from a scanset of the table scan node based on the column being a key column of the table; or filtering values scanned by the table scan node based on the column being a non-key column of the table; and returning the result set based on the run-time pruning performed during execution of the top K query on the table.

In Example 15, the subject matter of Example 14, wherein: the column is the key column of the table; and the performing of the run-time pruning comprises generating, by the table scan node, a filter based on the current boundary; and the removing of the one or more scanning ranges comprising applying, by the table scan node, the filter to the scanset during the scanning of the table to remove the one or more scanning ranges from the scanset.

In Example 16, the subject matter of Examples 14-15, wherein: the set of values is a first set of values identified by the table scan node in scanning the table; the column is a non-key column of the table; and the performing of the run-time pruning comprises generating, by the table scan node, a filter based on the current boundary; and the filtering of values comprises applying the filter to a second set of values identified in scanning the table, the applying of the filter to the second set of values comprising discarding at least one value from the second set of values; the operations comprise providing, by the table scan node, the filtered second set of values to the top k node.

In Example 17, the subject matter of Examples 14-16, wherein the run-time pruning comprises skipping a scan of a range of values in the scanset based on metadata describing the table.

In Example 18, the subject matter of Examples 14-17, wherein: the set of values is a first set of values identified by the table scan node in scanning the table; the performing of the run-time pruning comprises: determining, by the top K node, an updated boundary based on a second set of values identified by the table scan node in scanning the table; and applying, by the table scan node, the updated boundary to further prune data during the scanning of the table.

In Example 19, the subject matter of Examples 14-18, wherein the table scan node filters the second set of values based on the current boundary prior to sending the second set of values to the top K node.

In Example 20, the subject matter of Examples 14-19, wherein the operations comprise performing, by the table scan node, read-version pruning using the current boundary during the scanning of the table.

In Example 21, the subject matter of Examples 14-20, wherein: the scanset comprises scanning ranges from multiple versions of the table; performing the read-version pruning comprises: comparing the current boundary against metadata for each scanning range in the scanset; determining, based on the comparing, that all data in a particular version of the table is outside a range of potentially relevant results; and pruning scanning ranges from the particular version of the table from the scanset based on the determining that all the data in the particular version of the table is outside the range of potentially relevant results.

In Example 22, the subject matter of Examples 14-21, wherein the operations comprise sorting the scanning ranges of the scanset prior to performing the run-time pruning.

In Example 23, the subject matter of Examples 14-22, wherein sorting the scanning ranges comprises sorting the scanning ranges based on a key column of the table and the first clause of the query.

Example 24 is a computer-storage medium comprising instructions that, when executed by one or more processors of a machine, configure the machine to perform operations comprising: receiving a top K query directed at a table, the top K query comprising a first clause to sort a result set in an order based on a column of the table and a second clause that specifies a limit on a number of results provided in response to the query; initiating execution of the top K query on the table; determining, by a top K node, a current boundary based on a set of values identified by a table scan node in scanning the table; performing run-time pruning during execution of the top K query on the table using the current boundary, the run-time pruning comprising generating a filter using the current boundary and using the filter to: remove one or more scanning ranges from a scanset of the table scan node based on the column being a key column of the table; or filter values scanned by the table scan node based on the column being a non-key column of the table; and returning the result set based on the run-time pruning performed during execution of the top K query on the table.

In Example 25, the subject matter of Example 24, wherein: the set of values is a first set of values identified by the table scan node in scanning the table; the column is a non-key column of the table; and the filtering of values comprises applying the filter to a second set of values identified in scanning the table, the applying of the filter to the second set of values comprising discarding at least one value from the second set of values; the operations comprise providing, by the table scan node, the filtered second set of values to the top k node.

In Example 26, the subject matter of Examples 24-25, wherein the performing the run-time pruning comprises skipping a scan of a range of values in the scanset based on metadata describing the table.

In Example 27, the subject matter of Examples 24-26, wherein the operations comprise performing, by the table scan node, read-version pruning using the current boundary during the scanning of the table.

In Example 28, the subject matter of Examples 24-27, wherein: the scanset comprises scanning ranges from multiple versions of the table; performing the read-version pruning comprises: comparing the current boundary against metadata for each scanning range in the scanset; determining, based on the comparing, that all data in a particular version of the table is outside a range of potentially relevant results; and pruning scanning ranges from the particular version of the table from the scanset based on the determining that all the data in the particular version of the table is outside the range of potentially relevant results.

In Example 29, the subject matter of Examples 24-28, wherein the operations comprise sorting the scanning ranges of the scanset prior to performing the run-time pruning.

In Example 30, the subject matter of Examples 24-29, wherein sorting the scanning ranges comprises sorting the scanning ranges based on the key column of the table and the first clause of the query.

Figure 9:
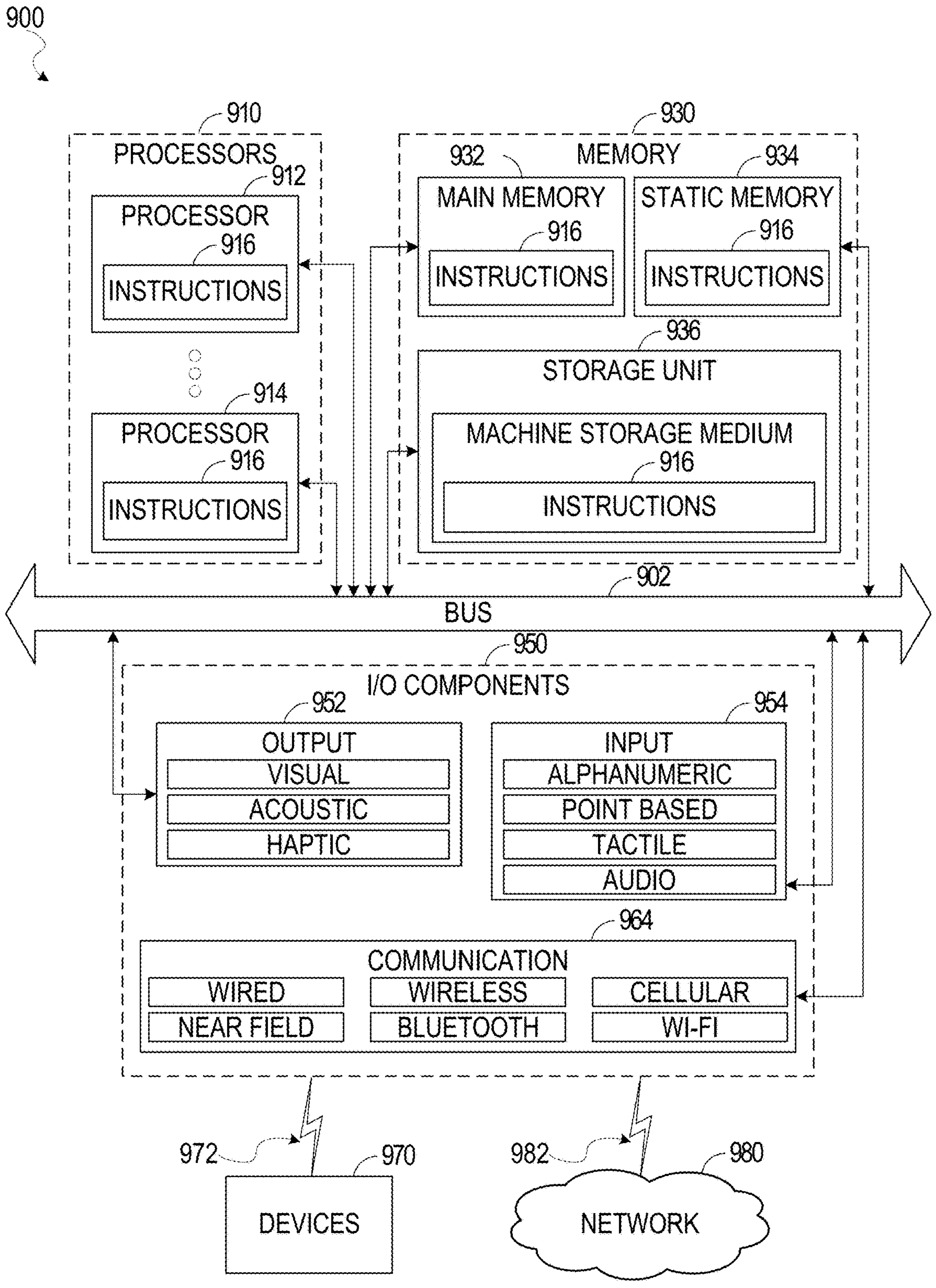
FIG. 9 illustrates a diagrammatic representation of a machine in the form of a computer system within which a set of instructions may be executed for causing the machine to perform any one or more of the methodologies discussed herein, in accordance with some embodiments of the present disclosure.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., a software, a program, an application, an applet, an app, or other executable code) for causing the machine 900 to perform any one or more of the methodologies discussed herein may be executed. For example, the instructions 916 may cause the machine 900 to execute any one or more operations of the method 400 or the method 800. As another example, the instructions 916 may cause the machine 900 to implement portions of the functionality illustrated in any one of FIGS. 1-3. In this way, the instructions 916 transform a general, non-programmed machine into a particular machine that is specially configured to carry out any one of the described and illustrated functions of the data platform 102 such as the compute service manager 108 (or a component thereof) or an execution node of the execution platform 110.

In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 includes processors 910, memory 930, and input/output (I/O) components 950 configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 914 and a processor 912 that may execute the instructions 916. The term "processor" is intended to include multi-core processors 910 that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, all accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 include components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube [CRT]), acoustic components (e.g., speakers), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, and other communication components to provide communication via other modalities. The devices 970 may be another machine or any of a wide variety of peripheral devices (e.g., a peripheral device coupled via a universal serial bus [USB]). For example, as noted above, the machine 900 may correspond to any one of the compute service manager 108, the execution platform 110, and the devices 970 may include the data store 206 or any other computing device described herein as being in communication with the data platform 102 or the data storage 104.

The various memories (e.g., 930, 932, 934, and/or memory of the processor(s) 910 and/or the storage unit 936) may store one or more sets of instructions 916 and data structures (e.g., software) embodying or utilized by any one or more of the methodologies or functions described herein. These instructions 916, when executed by the processor(s) 910, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of the methods 400 and 800 may be performed by one or more processors. The performance of certain of the operations may be distributed among the one or more processors, not only residing within a single machine, but also deployed across a number of machines. In some example embodiments, the processor or processors may be in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:

receiving a top K query directed at a table, the top K query comprising a first clause to sort a result set in an order based on a column of the table and a second clause that specifies a limit on a number of results provided in the result set;

initiating execution of the top K query on the table, the initiating of the execution of the top K query comprising:

generating a query plan for processing the top K query, the query plan comprising a top K node and a table scan node;

determining run-time pruning is applicable to the top K query based on whether the table scan node is a child node or dependent child node of the top K node; and based on determining run-time pruning is applicable to the top K query, adding a reference to the top K node in the table scan node, the reference enabling the table scan node to request a current boundary from the top K node at run-time;

determining, by the top K node, the current boundary based on a set of values identified by the table scan node in scanning the table;

performing the run-time pruning during execution of the top K query on the table using the current boundary, the performing of the run-time pruning comprising:

performing read-version pruning on a scanset of the table scan node using the current boundary during the scanning of the scanset, the scanset comprising multiple versions of the table, the performing of the read-version pruning comprising pruning data from one or more older versions of the table from the scanset;

generating a filter using the current boundary; and using the filter to:

remove one or more scanning ranges from the scanset of the table scan node based on the column being a key column of the table; or filter values scanned by the table scan node based on the column being a non-key column of the table; and returning the result set based on the run-time pruning performed during execution of the top K query on the table.

2. The method of claim 1, wherein:

the column is the key column of the table; and the performing of the run-time pruning comprises generating, by the table scan node, a filter based on the current boundary; and the removing of the one or more scanning ranges comprising applying, by the table scan node, the filter to the scanset during the scanning of the table to remove the one or more scanning ranges from the scanset.

3. The method of claim 1, wherein:

the set of values is a first set of values identified by the table scan node in scanning the table;

the column is a non-key column of the table; and the performing of the run-time pruning comprises generating, by the table scan node, a filter based on the current boundary; and the filtering of values comprises applying the filter to a second set of values identified in scanning the table, the applying of the filter to the second set of values comprising discarding at least one value from the second set of values;

the method comprises providing, by the table scan node, the filtered second set of values to the top K node.

4. The method of claim 1, wherein the run-time pruning comprises skipping a scan of a range of values in the scanset based on metadata describing the table.

5. The method of claim 1, wherein:

the set of values is a first set of values identified by the table scan node in scanning the table;

the performing of the run-time pruning comprises:

determining, by the top K node, an updated boundary based on a second set of values identified by the table scan node in scanning the table; and applying, by the table scan node, the updated boundary to further prune data during the scanning of the table.

6. The method of claim 5, wherein the table scan node filters the second set of values based on the current boundary prior to sending the second set of values to the top K node.

7. The method of claim 1, wherein:

the scanset comprises scanning ranges from multiple versions of the table;

performing the read-version pruning comprises:

comparing the current boundary against metadata for each scanning range in the scanset;

determining, based on the comparing, that all data in a particular older version of the table is outside a range of potentially relevant results; and pruning scanning ranges from the particular older version of the table from the scanset based on the determining that all the data in the particular older version of the table is outside the range of potentially relevant results.

8. The method of claim 7, wherein the performing of the read-version pruning comprises pruning corresponding scanning ranges from versions of the table that are older than the particular older version of the table.

9. The method of claim 1, comprising sorting the scanning ranges of the scanset prior to performing the run-time pruning.

10. The method of claim 9, wherein sorting the scanning ranges comprises sorting the scanning ranges based on the key column of the table and the first clause of the query.

11. The method of claim 1, wherein the determining of the current boundary comprises:

maintaining a heap of top-K values in the top K node, the heap of top-K values storing values scanned from the table by the table scan node; and determining the current boundary based on an extrema value in the heap of top-K values.

12. The method of claim 1, wherein the initiating of the execution of the top K query comprises: constructing column metadata for the column.

13. The method of claim 1, wherein:

the first clause comprises an ORDER BY clause in structured query language (SQL); and the second clause comprises a LIMIT clause in SQL.

14. A system comprising:

at least one hardware processor; and at least one memory storing instructions that cause the at least one hardware processor to perform operations comprising:

receiving a top K query directed at a table, the top K query comprising a first clause to sort a result set in an order based on a column of the table and a second clause that specifies a limit on a number of results provided in response to the query;

initiating execution of the top K query on the table, the initiating of the execution of the top K query comprising:

generating a query plan for processing the top K query, the query plan comprising a top K node and a table scan node;

determining run-time pruning is applicable to the top K query based on whether the table scan node is a child node or dependent child node of the top K node; and based on determining run-time pruning is applicable to the top K query, adding a reference to the top K node in the table scan node, the reference enabling the table scan node to request a current boundary from the top K node at run-time;

determining, by the top K node, the current boundary based on a set of values identified by the table scan node in scanning the table;

performing the run-time pruning during execution of the top K query on the table using the current boundary, the run-time pruning comprising:

performing read-version pruning on a scanset of the table scan node using the current boundary during the scanning of the scanset, the scanset comprising multiple versions of the table, the performing of the read-version pruning comprising pruning data from one or more older versions of the table from the scanset;

generating a filter using the current boundary; and using the filter to:

remove one or more scanning ranges from the scanset of the table scan node based on the column being a key column of the table; or filter values scanned by the table scan node based on the column being a non-key column of the table; and returning the result set based on the run-time pruning performed during execution of the top K query on the table.

15. The system of claim 14, wherein:

the column is the key column of the table; and the performing of the run-time pruning comprises generating, by the table scan node, a filter based on the current boundary; and the removing of the one or more scanning ranges comprising applying, by the table scan node, the filter to the scanset during the scanning of the table to remove the one or more scanning ranges from the scanset.

16. The system of claim 14, wherein:

the set of values is a first set of values identified by the table scan node in scanning the table;

the column is a non-key column of the table; and the performing of the run-time pruning comprises generating, by the table scan node, a filter based on the current boundary; and the filtering of values comprises applying the filter to a second set of values identified in scanning the table, the applying of the filter to the second set of values comprising discarding at least one value from the second set of values;

the operations comprise providing, by the table scan node, the filtered second set of values to the top K node.

17. The system of claim 14, wherein the run-time pruning comprises skipping a scan of a range of values in the scanset based on metadata describing the table.

18. The system of claim 14, wherein:

the set of values is a first set of values identified by the table scan node in scanning the table;

the performing of the run-time pruning comprises:

determining, by the top K node, an updated boundary based on a second set of values identified by the table scan node in scanning the table; and applying, by the table scan node, the updated boundary to further prune data during the scanning of the table.

19. The system of claim 18, wherein the table scan node filters the second set of values based on the current boundary prior to sending the second set of values to the top K node.

20. The system of claim 14, wherein:

the scanset comprises scanning ranges from multiple versions of the table;

performing the read-version pruning comprises:

comparing the current boundary against metadata for each scanning range in the scanset;

determining, based on the comparing, that all data in a particular older version of the table is outside a range of potentially relevant results; and pruning scanning ranges from the particular older version of the table from the scanset based on the determining that all the data in the particular older version of the table is outside the range of potentially relevant results.

21. The system of claim 20, wherein the performing of the read-version pruning comprises pruning corresponding scanning ranges from versions of the table that are older than the particular older version of the table.

22. The system of claim 14, wherein the operations comprise sorting the scanning ranges of the scanset prior to performing the run-time pruning.

23. The system of claim 22, wherein sorting the scanning ranges comprises sorting the scanning ranges based on a key column of the table and the first clause of the query.

24. A computer-storage medium comprising instructions that, when executed by one or more processors of a machine, configure the machine to perform operations comprising:

receiving a top K query directed at a table, the top K query comprising a first clause to sort a result set in an order based on a column of the table and a second clause that specifies a limit on a number of results provided in response to the query;

initiating execution of the top K query on the table, the initiating of the execution of the top K query comprising:

generating a query plan for processing the top K query, the query plan comprising a top K node and a table scan node;

determining run-time pruning is applicable to the top K query based on whether the table scan node is a child node or dependent child node of the top K node; and based on determining run-time pruning is applicable to the top K query, adding a reference to the top K node in the table scan node, the reference enabling the table scan node to request a current boundary from the top K node at run-time;

determining, by the top K node, the current boundary based on a set of values identified by the table scan node in scanning the table;

performing the run-time pruning during execution of the top K query on the table using the current boundary, the run-time pruning comprising:

performing read-version pruning on a scanset of the table scan node using the current boundary during the scanning of the scanset, the scanset comprising multiple versions of the table, the performing of the read-version pruning comprising pruning data from one or more older versions of the table from the scanset; and generating a filter using the current boundary and using the filter to:

remove one or more scanning ranges from a scanset of the table scan node based on the column being a key column of the table; or filter values scanned by the table scan node based on the column being a non-key column of the table; and returning the result set based on the run-time pruning performed during execution of the top K query on the table.

25. The computer-storage medium of claim 24, wherein:

the set of values is a first set of values identified by the table scan node in scanning the table;

the column is a non-key column of the table; and the filtering of values comprises applying the filter to a second set of values identified in scanning the table, the applying of the filter to the second set of values comprising discarding at least one value from the second set of values;

the operations comprise providing, by the table scan node, the filtered second set of values to the top K node.

26. The computer-storage medium of claim 24, wherein the performing the run-time pruning comprises skipping a scan of a range of values in the scanset based on metadata describing the table.

27. The computer-storage medium of claim 24, wherein:

the scanset comprises scanning ranges from multiple versions of the table;

performing the read-version pruning comprises:

comparing the current boundary against metadata for each scanning range in the scanset;

determining, based on the comparing, that all data in a particular older version of the table is outside a range of potentially relevant results; and pruning scanning ranges from the particular older version of the table from the scanset based on the determining that all the data in the particular older version of the table is outside the range of potentially relevant results.

28. The computer-storage medium of claim 27, wherein the performing of the read-version pruning comprises pruning corresponding scanning ranges from versions of the table that are older than the particular older version of the table.

29. The computer-storage medium of claim 24, wherein the operations comprise sorting the scanning ranges of the scanset prior to performing the run-time pruning.

30. The computer-storage medium of claim 29, wherein sorting the scanning ranges comprises sorting the scanning ranges based on the key column of the table and the first clause of the query.

* * * * *